United States Patent
Dou et al.

(10) Patent No.: US 12,338,137 B2
(45) Date of Patent: Jun. 24, 2025

(54) POSITIVE ELECTRODE ACTIVE MATERIAL AND PREPARATION METHOD THEREOF, POSITIVE ELECTRODE PLATE, LITHIUM-ION SECONDARY BATTERY, AND BATTERY MODULE, BATTERY PACK, AND APPARATUS CONTAINING SUCH LITHIUM-ION SECONDARY BATTERY

(71) Applicant: CONTEMPORARY AMPEREX TECHNOLOGY (HONG KONG) LIMITED, Hong Kong (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 151 days.

(21) Appl. No.: 17/682,374

(22) Filed: Feb. 28, 2022

(65) Prior Publication Data
US 2022/0185695 A1    Jun. 16, 2022

Related U.S. Application Data

(63) Continuation of application No. PCT/CN2020/109860, filed on Aug. 18, 2020.

(30) Foreign Application Priority Data

Sep. 2, 2019 (CN) .......................... 201910825140.5

(51) Int. Cl.
    *C01G 53/44*      (2025.01)
    *H01M 10/0525*    (2010.01)

(52) U.S. Cl.
    CPC ........ *C01G 53/44* (2013.01); *H01M 10/0525*
    (2013.01); *C01P 2006/10* (2013.01);
    (Continued)

(58) Field of Classification Search
    CPC ... H01M 10/0525; H01M 4/525; H01M 4/366
    See application file for complete search history.

(56) References Cited

U.S. PATENT DOCUMENTS

2018/0044200 A1*   2/2018   Wu ...................... H01M 4/1391
2018/0183046 A1*   6/2018   Jin ...................... H01M 4/1315
(Continued)

FOREIGN PATENT DOCUMENTS

| CN | 103500827 A | 1/2014 |
| CN | 103606671 A | 2/2014 |

(Continued)

OTHER PUBLICATIONS

CN103500827B Translation from Espacenet (Year: 2017).*
(Continued)

*Primary Examiner* — Nathanael T Zemui
(74) *Attorney, Agent, or Firm* — K&L Gates LLP

(57) ABSTRACT

A positive electrode active material and a preparation method thereof, a positive electrode plate, a lithium-ion secondary battery, and a battery module, battery pack, and apparatus containing such lithium-ion secondary battery are provided. The positive electrode active material includes matrix particles and a coating layer covering an exterior surface of the matrix particle, where the matrix particle includes a lithium nickel cobalt manganese oxide, and the coating layer includes an oxide of element $M^1$; the matrix particle is doped with element $M^2$ and element $M^3$, element $M^2$ in the matrix particle is uniformly distributed, and element $M^3$ in the matrix particle has a decreasing concentration from the exterior surface to a core of the matrix (Continued)

particle; and element $M^1$ and element $M^3$ are each independently selected from one or more of Mg, Al, Ca, Ba, Ti, Zr, Zn, and B, and element $M^2$ includes one or more of Si, Ti, Cr, Mo, V, Ge, Se, Zr, Nb, Ru, Rh, Pd, Sb, Te, Ce, and W.

18 Claims, 5 Drawing Sheets

(52) U.S. Cl.
CPC ....... *C01P 2006/11* (2013.01); *C01P 2006/12* (2013.01); *C01P 2006/40* (2013.01)

(56) References Cited

U.S. PATENT DOCUMENTS

| | | | |
|---|---|---|---|
| 2019/0207215 A1* | 7/2019 | Tokoro | H01M 10/052 |
| 2019/0207246 A1 | 7/2019 | Dahn et al. | |
| 2020/0274160 A1* | 8/2020 | Ren | H01M 4/62 |
| 2021/0167378 A1* | 6/2021 | Koshika | H01M 4/525 |
| 2022/0166016 A1* | 5/2022 | Sun | H01M 10/052 |

FOREIGN PATENT DOCUMENTS

| | | | | | |
|---|---|---|---|---|---|
| CN | 104282901 | A | 1/2015 | | |
| CN | 104409700 | A | 3/2015 | | |
| CN | 104904043 | A | 9/2015 | | |
| CN | 106058230 | A | 10/2016 | | |
| CN | 106229489 | A | 12/2016 | | |
| CN | 106602021 | A | 4/2017 | | |
| CN | 103500827 | B | * 5/2017 | ........ | H01M 10/0525 |
| CN | 107275633 | A | 10/2017 | | |
| CN | 107611384 | A | 1/2018 | | |
| CN | 108221051 | A | 6/2018 | | |
| CN | 109167051 | A | 1/2019 | | |
| CN | 109273710 | A | 1/2019 | | |
| CN | 109904424 | A | 6/2019 | | |

OTHER PUBLICATIONS

China Second Office Action for Application No. 201910825140.5, issued on Dec. 3, 2021, 6 pages.
China Rejection Decision for Application No. 201910825140.5, issued on Mar. 21, 2022, 6 pages.
Extended European Search Report for Application No. 20861055.0, issued on May 23, 2022, 10 pages.
European Office Action 1 for Application No. 20861055.0, issued on Nov. 21, 2022, 9 pages.
ISR for International Application PCT/CN2020/109860 mailed Nov. 19, 2020.
Written Opinion for International Application PCT/CN2020/109860 mailed Nov. 19, 2020.
Chinese Office Action for counterpart application 201910625140.5 mailed Aug. 4, 2021.

* cited by examiner

POSITIVE ELECTRODE ACTIVE MATERIAL AND PREPARATION METHOD THEREOF, POSITIVE ELECTRODE PLATE, LITHIUM-ION SECONDARY BATTERY, AND BATTERY MODULE, BATTERY PACK, AND APPARATUS CONTAINING SUCH LITHIUM-ION SECONDARY BATTERY

CROSS-REFERENCE TO RELATED APPLICATIONS

This application is a continuation of International Patent Application No. PCT/CN2020/109860 filed on 18 Aug. 2020, which claims priority to Chinese Patent Application No. 201910825140.5 filed on Sep. 2, 2019 and entitled "POSITIVE ELECTRODE ACTIVE MATERIAL AND PREPARATION METHOD THEREOF, POSITIVE ELECTRODE PLATE, AND LITHIUM-ION SECONDARY BATTERY", which is incorporated herein by reference in its entirety.

TECHNICAL FIELD

This application relates to the technical field of secondary batteries, and specifically, to a positive electrode active material and a preparation method thereof, a positive electrode plate, a lithium-ion secondary battery, and a battery module, battery pack, and apparatus containing such lithium-ion secondary battery.

BACKGROUND

Lithium-ion secondary batteries are rechargeable batteries that operate mainly depending on migration of lithium ions between a positive electrode and a negative electrode. They are a form of clean energy that is widely used currently. As an important part of a lithium-ion secondary battery, a positive electrode active material provides the lithium ions that move back and forth between the positive and negative electrodes in a battery charge/discharge process, and therefore the positive electrode active material is of great importance to battery performance.

Lithium nickel cobalt manganese oxides have high theoretical capacity. A lithium-ion secondary battery using a lithium nickel cobalt manganese oxide as a positive electrode active material is expected to a high energy density, but such lithium-ion secondary battery has low high-temperature cycling performance and generates much gas in practical use.

SUMMARY

A first aspect of this application provides a positive electrode active material, including matrix particles and a coating layer covering an exterior surface of the matrix particle, where the matrix particle includes a lithium nickel cobalt manganese oxide, and the coating layer includes an oxide of element $M^1$; the matrix particle is doped with element $M^2$ and element $M^3$, relative deviation of a local mass concentration of element $M^2$ in the matrix particle is 20% or below, and element $M^3$ in the matrix particle has a decreasing concentration from the exterior surface to a core of the matrix particle; and element $M^1$ and element $M^3$ are each independently selected from one or more of Mg, Al, Ca, Ba, Ti, Zr, Zn, and B, and element $M^2$ includes one or more of Si, Ti, Cr, Mo, V, Ge, Se, Zr, Nb, Ru, Rh, Pd, Sb, Te, Ce, and W.

The positive electrode active material provided in this application includes the lithium nickel cobalt manganese oxide that has a high specific capacity. The matrix particle of the positive electrode active material is uniformly doped with element $M^2$, the matrix particle is doped with element $M^3$ that has a decreasing concentration in the direction from the exterior surface to the core of the matrix particle, the exterior surface of the matrix particle is also coated with the element $M^1$-containing oxide coating layer, and element $M^1$, element $M^2$, and element $M^3$ are each selected from a specific type of element. This can ensure a high extractable capacity of the positive electrode active material, effectively improve the structural stability of the positive electrode active material in high-temperature cycling and high-temperature storage processes, reduce side reactions of an electrolyte on the surface of the material, and improve the low-gas-production performance of the material to reduce gas generated by the battery. Therefore, with the positive electrode active material in this application, the lithium-ion secondary battery can have high energy density, high-temperature cycling performance, and high-temperature storage performance.

In any one of the foregoing embodiments, a concentration ratio of element $M^1$ to element $M^3$ is 0.1:1 to 20:1, optionally, 1:1 to 5:1, and further optionally, 1:1 to 3:1; and both a concentration of element $M^1$ and a concentration of element $M^3$ are concentrations in the positive electrode active material, measured in ppm. The concentration ratio of element $M^1$ to element $M^3$ is controlled within a proper range. This helps the coating layer and the matrix particle to be bonded more firmly, and also helps improve the ionic conductivity of the positive electrode active material, thereby further improving the high-temperature cycling performance and high-temperature storage of the battery.

In any one of the foregoing embodiments, the matrix particle may be doped with element X of 0 ppm to 5000 ppm, element X includes one or more of F, Cl, Br, and S, and a concentration of element X is a concentration in the positive electrode active material. Doping the matrix particle with a proper amount of element X can further improve the structural stability of the positive electrode active material, and reduce side reactions on the surface of the particle, thereby further improving the high-temperature cycling performance and high-temperature storage performance of the battery.

Optionally, when the concentration of element X in the matrix particle is greater than 0 ppm, element X has a decreasing concentration in the direction from the exterior surface to the core of the matrix particle. The positive electrode active material can have a high extractable capacity, thereby enabling the battery to have high energy density.

In some embodiments, optionally, from an exterior surface to a core of a particle of the positive electrode active material, a sum of mass of element $M^1$, element $M^3$, and element X within a thickness range of ⅕ of a particle size of the particle of the positive electrode active material accounts for 50% or above, and optionally, 55% or above of total mass of element $M^1$, element $M^3$, and element X in the particle of the positive electrode active material; or from an exterior surface to a core of a particle of the positive electrode active material particle, a sum of mass of element $M^1$, element $M^3$, and element X within a thickness range of ⅔ of a particle size of the particle of the positive electrode active material accounts for 90% or above, and optionally, 93% or above of total mass of element $M^1$, element $M^3$, and element X in the particle of the positive electrode active material. The positive electrode active material that meets the above conditions has a more stable structure, and lower side reaction activity on the surface, such that the positive electrode active material has good lithium ion conductivity, thereby significantly improving the energy density, high-temperature cycling performance, and high-temperature storage performance of the battery.

In any one of the foregoing embodiments, element $M^1$ is the same as element $M^3$. When element $M^1$ is the same as element $M^3$, the overall stability of the positive electrode active material particle is better, and the positive electrode active material has better lithium ion conductivity, thereby improving the performance of the battery.

In any one of the foregoing embodiments, the concentration of element $M^1$ in the positive electrode active material ranges from 100 ppm to 3000 ppm, and optionally, 1000 ppm to 2500 ppm. The concentration of element $M^1$ in the positive electrode active material falling within the foregoing range can further improve the high-temperature cycling performance and high-temperature storage performance of the battery.

In any one of the foregoing embodiments, the concentration of element $M^2$ in the positive electrode active material ranges from 100 ppm to 5000 ppm, and optionally, 1000 ppm to 3500 ppm. The concentration of element $M^2$ in the positive electrode active material falling within the foregoing range can better improve the high-temperature cycling performance and high-temperature storage performance of the battery, and can also increase the energy density of the battery.

In any one of the foregoing embodiments, the concentration of element $M^3$ in the positive electrode active material ranges from 100 ppm to 3000 ppm, and optionally, 600 ppm to 1500 ppm. The concentration of element $M^3$ in the positive electrode active material falling within the foregoing range can further improve the high-temperature cycling performance and high-temperature storage performance of the battery.

In any one of the foregoing embodiments, a volume average particle size $D_v50$ of the positive electrode active material ranges from 8 μm to 20 μm, optionally, 10 μm to 18 μm, and further optionally, 12 μm to 16 μm. When the $D_v50$ of the positive electrode active material falls within the above range, the cycling performance and rate performance of the battery can be improved, and the energy density of the battery can also be improved.

In any one of the foregoing embodiments, a thickness T of the coating layer ranges from 0.001 μm to 0.5 μm, optionally, 0.05 μm to 0.4 μm, and further optionally, 0.2 μm to 0.3 μm. The thickness of the coating layer falls within the above range, enabling the battery to have high energy density, high-temperature cycling performance, and high-temperature storage performance.

In any one of the foregoing embodiments, the thickness T of the coating layer and an average particle size $\overline{D}$ of the positive electrode active material satisfies: $0.002 \leq T/\overline{D} \leq 0.031$, optionally, $0.005 \leq T/\overline{D} \leq 0.02$, and optionally, $0.01 \leq T/\overline{D} \leq 0.02$. The positive electrode active material satisfying the foregoing conditions can further improve the high-temperature cycling performance and high-temperature storage performance of the battery.

In any one of the foregoing embodiments, when the positive electrode active material is in a 78% delithiated state, an average valence of element $M^2$ is α; when the positive electrode active material is in an 11% delithiated state, an average valence of element $M^2$ is β; and α and β satisfy: $α \geq β \geq +3$. In this way, the positive electrode active material can have higher structural stability and lower side reaction activity on the surface, and can also provide more electrons in a charging process of the battery. Therefore, the high-temperature cycling performance, high-temperature storage performance, and energy density of the battery can be improved.

In any one of the foregoing embodiments, the lithium nickel cobalt manganese oxide is a compound represented by chemical formula 1:

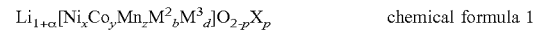

chemical formula 1 in chemical formula 1, X is selected from one or more of F, Cl, Br, and S, $0.5 \leq x < 1$, $0 < y < 0.3$, $0 < z < 0.3$, $-0.1 \leq α \leq 0.2$, $0 < b \leq 0.1$, $0 < d \leq 0.1$, $0 \leq p \leq 0.1$, and $x+y+z+b+d=1$.

A second aspect of this application provides a positive electrode plate, including a positive electrode current collector and a positive electrode active substance layer disposed on the positive electrode current collector, where the positive electrode active substance layer includes the positive electrode active material in this application.

Since the positive electrode plate in this application includes the positive electrode active material, a lithium-ion secondary battery using the positive electrode plate can have good high-temperature cycling performance and high-temperature storage performance.

A third aspect of this application provides a lithium-ion secondary battery, including the positive electrode plate in this application.

The lithium-ion secondary battery in this application includes the positive electrode plate, and therefore can have high energy density, high-temperature cycling performance, and high-temperature storage performance.

A fourth aspect of this application provides a battery module, including the lithium-ion secondary battery in this application.

A fifth aspect of this application provides a battery pack, including the lithium-ion secondary battery or the battery module in this application.

A sixth aspect of this application provides an apparatus, including at least one of the lithium-ion secondary battery, the battery module, or the battery pack in this application.

The battery module, the battery pack, and the apparatus in this application include the lithium-ion secondary battery in this application, and therefore have at least advantages the same as or similar to the lithium-ion secondary battery.

A seventh aspect of this application provides a preparation method for a positive electrode active material, including:

(a) mixing a nickel-cobalt-manganese ternary material precursor, a lithium source, and an element $M^2$ precursor, and performing sintering treatment, to obtain a substrate particle uniformly doped with element $M^2$;

(b) mixing the substrate particle with a modified-element precursor, and performing sintering treatment, to cause a modifying element to dope the substrate particle at a decreasing concentration from an exterior surface to a core of the substrate particle, to obtain a matrix particle, where the modifying element is element $M^3$ or a combination of element $M^3$ and element X; and (c) mixing the matrix particle with an element $M^1$ precursor, and performing sintering treatment, to form an element $M^1$-containing oxide coating layer on an exterior surface of the matrix particle, so as to obtain a positive electrode active material, where relative deviation of a local mass concentration of element $M^2$ in the matrix particle is 20% or below; and element $M^1$ and element $M^3$ are each independently selected from one or more of Mg, Al, Ca, Ba, Ti, Zr, Zn, and B, element $M^2$ includes one or more of Si, Ti, Cr, Mo, V, Ge, Se, Zr, Nb, Ru, Rh, Pd, Sb, Te, Ce, and W, and element X includes one or more of F, Cl, Br, and S.

In any one of the foregoing embodiments, a temperature for the sintering treatment in step (a) is 600° C. to 1000° C., optionally, 650° C. to 950° C., and further optionally, 700° C. to 900° C.

In any one of the foregoing embodiments, a temperature for the sintering treatment in step (b) is 600° C. to 950° C., and optionally, 600° C. to 800° C.

In any one of the foregoing embodiments, a temperature for the sintering treatment in step (c) is 150° C. to 500° C., and optionally, 200° C. to 450° C.

DESCRIPTION OF EMBODIMENTS

To make the objectives, technical solutions, and beneficial technical effects of this application clearer, this application is further described below in detail with reference to embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may act as its own lower limit or upper limit to be combined with any other point or individual value or combined with any other lower limit or upper limit to form a range not expressly recorded.

In the descriptions of this specification, it should be noted that "above" and "below" include the number itself, "more types" in "one or more types" means at least two types, and "more" in "one or more" means at least two, unless otherwise specified.

In the descriptions of this specification, unless otherwise stated, the term "or (or)" is inclusive. For example, the phrase "A or (or) B" means "A, B, or both A and B." More specifically, all the following conditions fall within the condition "A or B": A is true (or present) but B is false (or not present); A is false (or not present) but B is true (or present); or both A and B are true (or present).

The foregoing invention content of this application is not intended to describe each of the disclosed embodiments or implementations of this application. The following description illustrates exemplary embodiments in more detail by using examples. Throughout this application, guidance is provided by using a series of embodiments and the embodiments may be used in various combinations. In each instance, enumeration is only representative but should not be interpreted as exhaustive.

Positive Electrode Active Material

Figure 1:
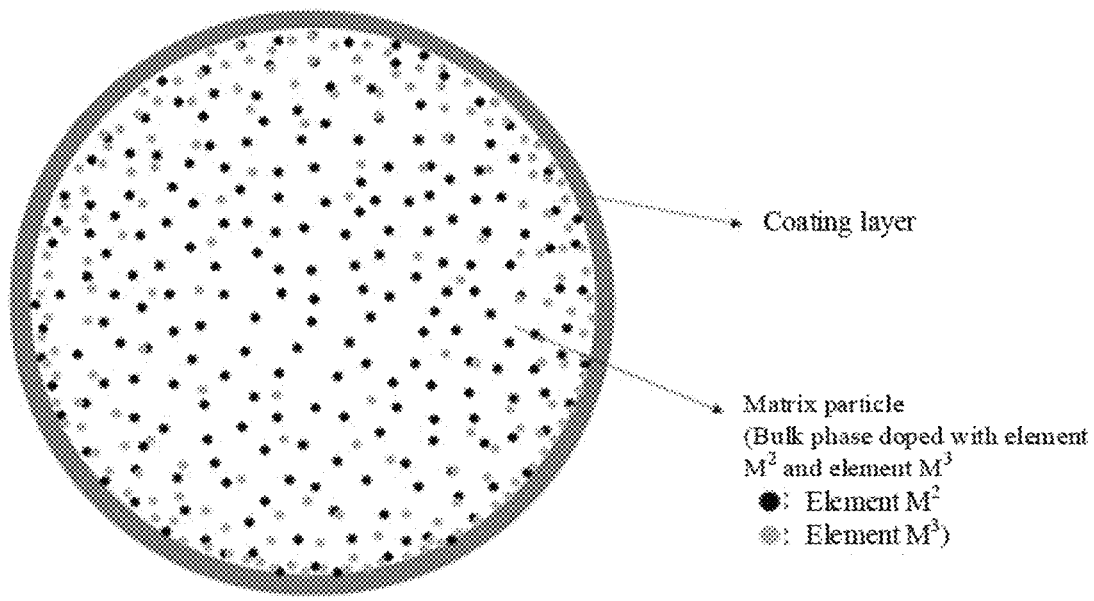
FIG. 1 is a schematic diagram of coating and doping of a positive electrode active material according to an embodiment of this application.

As shown in FIG. 1, a positive electrode active material in this application includes matrix particles and a coating layer covering an exterior surface of the matrix particle, where the matrix particle includes a lithium nickel cobalt manganese oxide, and the coating layer includes an oxide of element $M^1$; the matrix particle is doped with element $M^2$ and element $M^3$, relative deviation of a local mass concentration of element $M^2$ in the matrix particle is 20% or below, and element $M^3$ in the matrix particle has a decreasing concentration from the exterior surface to a core of the matrix particle; and element $M^1$ and element $M^3$ are each independently selected from one or more of Mg, Al, Ca, Ba, Ti, Zr, Zn, and B, and element $M^2$ includes one or more of Si, Ti, Cr, Mo, V, Ge, Se, Zr, Nb, Ru, Rh, Pd, Sb, Te, Ce, and W.

The positive electrode active material in this embodiment of this application includes the lithium nickel cobalt manganese oxide. The lithium nickel cobalt manganese oxide has a high specific capacity. With the positive electrode active material, a lithium-ion secondary battery can have high energy density. Optionally, in the lithium nickel cobalt manganese oxide, the number of moles of nickel accounts for 50% to 95% of the total number of moles of transition-metal-site elements. Optionally, based on a total molar percentage of transition-metal-site elements in a nickel-containing lithium composite oxide, a molar percentage of nickel is greater than or equal to 50%, 60%, 65%, 70%, 75%, or 80%. A higher nickel percentage in the lithium nickel cobalt manganese oxide means a larger gram capacity of the positive electrode active material, helping increase the energy density of the battery. Optionally, based on a total molar percentage of transition-metal-site elements in a nickel-containing lithium composite oxide, a molar percentage of nickel is less than or equal to 80%, 85%, 90%, 95%, or the like. The positive electrode active material can have good high-temperature stability and low-gas-production performance, enabling the battery to have improved high-temperature cycling performance and high-temperature storage performance.

The lithium nickel cobalt manganese oxide has a layered structure with a lithium site, a transition metal site, and an oxygen site. The transition-metal-site elements are elements at transition metal sites.

Doping the matrix particle with element $M^2$ and $M^3$ can effectively bind oxygen atoms, so that the positive electrode active material is not prone to oxygen release during high-temperature cycling and high-temperature storage, thereby significantly improving the structural stability of the positive electrode active material, and reducing surface activity of the positive electrode active material. The exterior surface of the matrix particle is also coated with the element $M^1$-containing oxide coating layer, which can protect the matrix particle and prevent the matrix particle from coining into contact with an electrolyte. The synergistic effect of the coating with the element $M^1$-containing oxide and the doping of element $M^2$ and element $M^3$ effectively prevents an irreversible structural phase change of the positive electrode active material, ensures that the material structure remains in a smectic phase state with strong electrochemical activity, effectively protects the surface of the positive electrode active material from corrosion by the electrolyte, reduces side reactions, and improves the low-gas-production performance of the material to reduce gas produced by the battery. In this way, the battery can have a high extractable capacity and good high-temperature cycling performance and high-temperature storage performance.

Element $M^2$ may have a stable valence above +3, such as +4, +5, +6, +7, and +8. Element $M^2$ can contribute many electrons in the positive electrode active material, helping reduce $Ni4^+$ with strong oxidization and reduce surface oxygen defects, further reducing surface activity of the positive electrode active material, reducing gas produced due to electrolyte decomposition during high-temperature cycling and high-temperature storage, and enabling the positive electrode active material to have high lithium ion migration and diffusion capabilities. The electrons contributed by element $M^2$ can also enable the positive electrode active material to release more lithium ions during the charging process of the battery, thereby further increasing the energy density of the battery.

In addition, the relative deviation of the local mass concentration of element $M^2$ in the matrix particle of the positive electrode active material is 20% or below, optionally, 15% or below, and further optionally, 12% or 10% or below.

In this specification, the local mass concentration of element $M^2$ in the matrix particle is a mass concentration of element $M^2$ in all elements in a finite volume element at any selected site in the matrix particle, and may be obtained by testing the element concentration distribution through EDX (Energy Dispersive X-Ray Spectroscopy, energy dispersive X-ray spectroscopy) or EDS element analysis in combination with TEM (Transmission Electron Microscope, transmission electron microscope) or SEM (Scanning Electron Microscope, scanning electron microscope) single-point scanning, or through another similar method. When testing is performed through EDX or EDS element analysis in combination with TEM or SEM single-point scanning, mass concentrations of element $M^2$ measured in μg/g at different sites of the matrix particle are recorded as $\eta_1, \eta_2, \eta_3, \ldots,$ and $\eta_n$, where n is a positive integer greater than or equal to 15.

An average mass concentration of element $M^2$ in the matrix particle is a mass concentration of element $M^2$ in all elements within a single matrix particle, and can be obtained by testing the element concentration distribution through EDX or EDS element analysis in combination with TEM or SEM plane scanning, or through another similar method. When the element concentration distribution is tested through EDX or EDS element analysis in combination with TEM or SEM plane scanning, a test plane includes all points in the foregoing single-point test. The average mass concentration of element $M^2$ in the matrix particle is recorded as $\bar{\eta}$ measured in μg/g.

The relative deviation σ of the local mass concentration of element $M^2$ in the matrix article is calculated according to the following formula (1):

$$\sigma = \frac{\max\{|\eta_1 - \bar{\eta}|, |\eta_2 - \bar{\eta}|, |\eta_3 - \bar{\eta}|, \ldots, |\eta_1^{-1}|\}}{\bar{\eta}} \quad \text{formula (1)}$$

The relative deviation of the local mass concentration of element $M^2$ in the matrix particle is 20% or below, optionally, 15% or below, and further optionally, 10% or below. This means that distribution uniformity of element $M^2$ in the matrix particle is relatively high. The uniform doping of element $M^2$ enables properties of all sites inside the particle to be consistent, so that element $M^2$ can better improve the structural stability of the positive electrode active material, thereby effectively preventing the particle from cracking. In addition, migration and diffusion capabilities of lithium ions in different zones inside the particle uniformly doped with element $M^2$ are at the same level, and deformation resistance of all sites of the particle is close to each other, so that internal stresses of the particle are uniformly distributed, thereby improving the structural stability of the positive electrode active material and preventing cracking. In this way, the extractable capacity and high-temperature cycling performance of the positive electrode active material are both improved, thereby improving the capacity performance, energy density, and high-temperature cycling performance of the lithium-ion secondary battery.

In addition, the positive electrode active material uniformly doped with element $M^2$ also suppresses side reactions caused by a fresh surface exposed due to cracking of the particle, and further improves the low-gas-production performance of the material, thereby improving the high-temperature storage performance of the battery.

A smaller relative deviation of the local mass concentration of element $M^2$ in the matrix particle means higher distribution uniformity of doping element $M^2$ in the matrix particle, and a higher extractable capacity, high-temperature cycling performance, and high-temperature storage performance of the positive electrode active material.

In some embodiments, element $M^2$ may include one or more of Ti, Ge, Zr, Nb, Ru, Sb, and W. Optionally, element $M^2$ may include one or more of Ge, Nb, Ru, and Sb. A proper element $M^2$ can further improve the structural stability of the positive electrode active material, thereby further improving the high-temperature cycling performance and high-temperature storage performance of the battery. In addition, the grain capacity of the positive electrode active material can also be improved, thereby enabling the battery to obtain higher energy density.

Compared with element $M^2$, element $M^3$ has a lower valence, is not prone to a valence change during a cycling process of the positive electrode material, and forms a more stable phase structure with element Li and element O. Element $M^3$ presents a decreasing concentration in the direction from the exterior surface to the core of the matrix particle, and therefore can stabilize the material structure, effectively reduce surface activity of the matrix particle, and further improve the energy density, high-temperature cycling performance, and high-temperature storage performance of the battery.

In some embodiments, element $M^3$ may include one or more of Al, Ca, Ba, Ti, Zr, and B. Optionally, element $M^3$ may include one or more of Al, Ti, and Zr. A proper element $M^3$ can further improve the surface stability of the material, and reduce side reaction activity on the surface of the particle, thereby further improving the high-temperature cycling performance and high-temperature storage performance of the battery.

In some embodiments, element $M^1$ may include one or more of Al, Ti, and Zr. Optionally, element $M^3$ may include one or more of Al, Ti, and Zr. A proper element $M^1$ can better protect the matrix particle, and further improve the high-temperature cycling performance and high-temperature storage performance of the battery.

In some embodiments, a concentration ratio of element $M^1$ to element $M^3$ may be 0.1:1 to 20:1, optionally, 0.1:1 to 10:1, and further optionally, 1:1 to 5:1, 1:1 to 3:1, or 1.5:1 to 2.2:1. Both a concentration of element $M^1$ and a concentration of element $M^3$ are concentrations in the positive electrode active material, measured in ppm.

The concentration ratio of element $M^1$ to element $M^3$ is controlled within a proper range. This helps the coating layer to be bonded with the matrix particle more firmly, prevents the coating layer from falling off during high-temperature cycling and high-temperature storage processes, and more reliably protects the positive electrode active material, thereby fully exerting the foregoing effects. The concentration ratio of element $M^1$ to element $M^3$ falling within the foregoing range further helps improve the ionic conductivity of the positive electrode active material and improve the extractable capacity of the battery.

In some optional embodiments, the matrix particle is doped with element X of 0 ppm to 5000 ppm, element X includes one or more of F, Cl, Br, and S, and a concentration of element X is a concentration in the positive electrode active material. Optionally, the concentration of element X in the positive electrode active material is greater than or equal to 0 ppm, 100 ppm, 300 ppm, 500 ppm, 800 ppm, 1000 ppm, 1200 ppm, 1500 ppm, 1700 ppm, 2000 ppm, 2500 ppm, or 3000 ppm. Optionally, the concentration of element X in the positive electrode active material is less than or equal to 3200 ppm, 3500 ppm, 4000 ppm, 5000 ppm, or the like. Doping the matrix particle with a preset amount of element X can further improve the structural stability of the positive electrode active material, and reduce side reactions on the surface of the particle, thereby further improving the high-temperature cycling performance and high-temperature storage performance of the battery.

Figure 2:
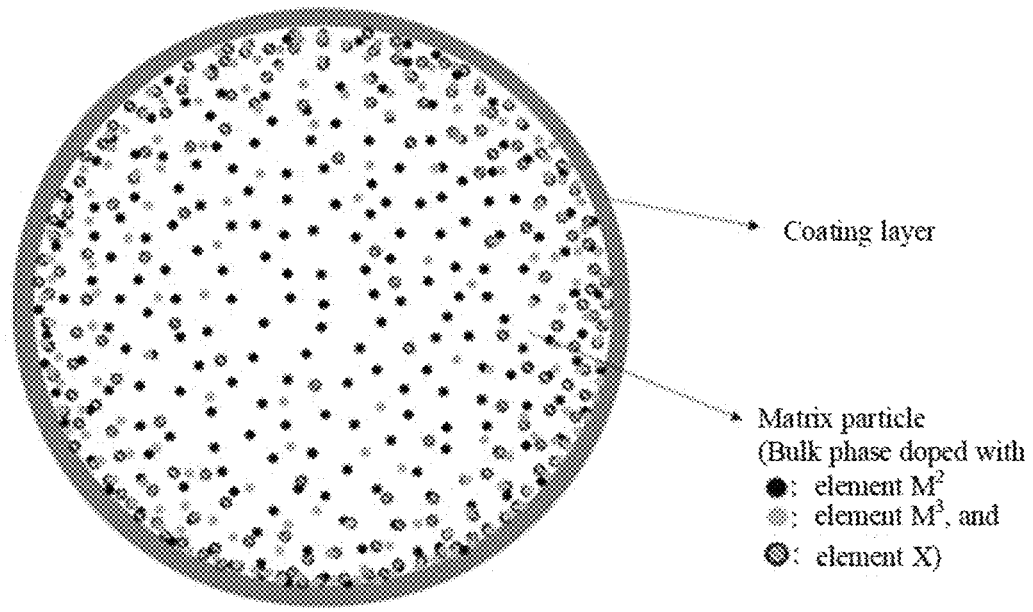
FIG. 2 is a schematic diagram of coating and doping of another positive electrode active material according to an embodiment of this application.

In some embodiments, as shown in FIG. 2, when the concentration of element X in the matrix particle is greater than 0 ppm, element X in the matrix particle may have a decreasing concentration in the direction from the exterior surface to the core of the matrix particles. In this way, the positive electrode active material has a high extractable capacity, thereby enabling the battery to have high energy density.

Optionally, from an exterior surface to a core of a particle of the positive electrode active material, a sum of mass of element $M^1$, element $M^3$, and element X within a thickness range of ⅕ of a particle size of the particle of the positive electrode active material accounts for 40% or above, optionally, 50% or above, and further optionally, 55% or above of total mass $\omega_1$ of element $M^1$, element $M^3$, and element X in the particle of the positive electrode active material.

Element $M^1$, element $M^3$, and element X are mainly present on a surface layer of the positive electrode active material, and can improve the lithium ion conductivity of the positive electrode active material while stabilizing the structure of the positive electrode active material and reducing the surface activity of the positive electrode active material, thereby improving the extractable capacity of the battery.

Optionally, from an exterior surface to a core of a particle of the positive electrode active material, a sum of mass of element $M^1$, element $M^3$, and element X within a thickness range of ⅔ of a particle size of the particle of the positive electrode active material accounts for 80% or above, optionally, 90% or above, and further optionally, 93% or above of total mass on of element $M^1$, element $M^3$, and element X in the particle of the positive electrode active material. In this way, the positive electrode active material has a more stable structure, lower surface activity, and a high extractable capacity, thereby significantly improving the energy density, high temperature high-temperature cycling performance, and high temperature high-temperature storage performance of the battery.

Figure 3:
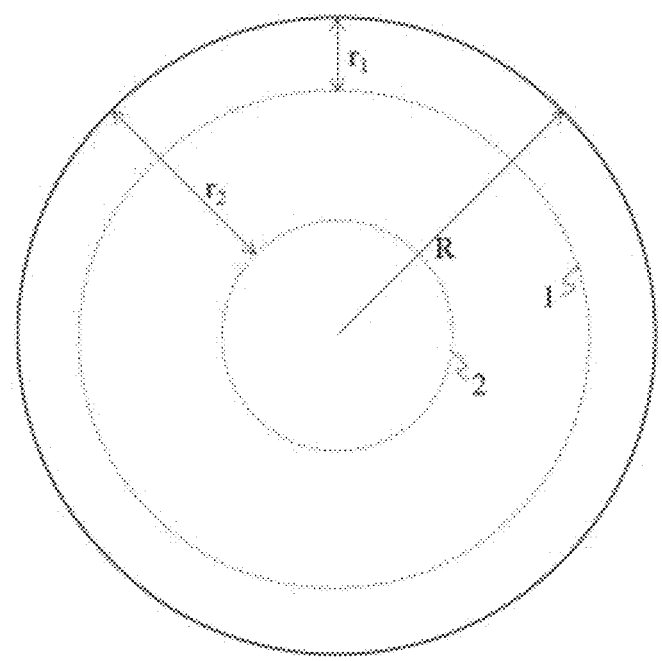
FIG. 3 is a cross section of a positive electrode active material particle obtained through EDS and SEM scanning test, where a range from an exterior surface of the particle to outer dashed line 1 is a thickness range of ⅓ of a particle size of the positive electrode active material from the exterior surface to a core of the positive electrode active material particle, and a range from the exterior surface of the particle to inner dashed line 2 is a thickness range of ⅔ of the particle size of the positive electrode active material in the direction from the exterior surface to the core of the positive electrode active material particle; and in any direction of the cross section of the particle, a thickness $r_1$ from the exterior surface of the particle to outer dashed line 1 is ⅓ of a radius R of the positive electrode active material particle in this direction, and a thickness $r_2$ from the exterior surface of the particle to inner dashed line 2 is ⅔ of the radius R of the positive electrode active material particle in this direction.

In this specification, a cross section polisher (for example, an IB-09010CP argon ion cross section polisher made by Japan Electron Optics Laboratory (JEOL) may be used to prepare a cross section (as shown in FIG. 3) of the positive electrode active material particle. The cross section runs through the core of the positive electrode active material particle. Then an element distribution diagram is obtained through EDX or EDS element analysis in combination with TEM or SEM (for example, an X-Max EDS made by Oxford Instruments in the UK in combination with a Sigma-02-33 SEM made by German ZEISS) plane scanning, so as to determine $\omega_1$ and $\omega_2$ based on element distribution in the cross section.

It can be understood that element $M^1$ and element $M^3$ in the positive electrode active material may be the same or different. In some embodiments, element $M^1$ and element $M^3$ in the positive electrode active material are the same. When element $M^1$ is the same as element $M^3$, the overall stability of the positive electrode active material particle is better, the bonding strength between element $M^1$ and the matrix particle can be improved, and the positive electrode active material has better lithium ion conductivity, thereby improving the comprehensive performance of the battery.

The concentration of element $M^2$ in the positive electrode active material may range from 100 ppm to 7000 ppm, and optionally, 100 ppm to 5000 ppm. Optionally, the concentration of element $M^2$ in the positive electrode active material is greater than or equal to 100 ppm, 300 ppm, 500 ppm, 800 ppm, 1000 ppm, 1200 ppm, 1500 ppm, 1700 ppm, 2000 ppm, 2500 ppm, 2800 ppm, or 3000 ppm. Optionally, the concentration of element $M^2$ in the positive electrode active material is less than or equal to 3200 ppm, 3500 ppm, 4000 ppm, 5000 ppm, or the like. Further optionally, the concentration of element $M^2$ in the positive electrode active material may range from 1000 ppm to 3500 ppm, 2500 ppm to 3200 ppm, or 2800 ppm to 3200 ppm. The concentration of element $M^2$ in the positive electrode active material falling within the foregoing range can better improve the high-temperature cycling performance and high-temperature storage performance of the battery, and effectively exert the charge compensation function of element $M^2$ in the positive electrode active material.

The concentration of element $M^3$ in the positive electrode active material optionally ranges from 100 ppm to 3000 ppm. Optionally, the concentration of element $M^3$ in the positive electrode active material is greater than or equal to 100 ppm, 300 ppm, 500 ppm, 600 ppm, 800 ppm, 900 ppm, or 1000 ppm. Optionally, the concentration of element $M^3$ in the positive electrode active material is less than or equal to 1100 ppm, 1200 ppm, 1500 ppm, 1700 ppm, 2000 ppm, 2200 ppm, 2500 ppm, 2700 ppm, 3000 ppm, or the like. Further optionally, the concentration of element $M^3$ in the positive electrode active material ranges from 600 ppm to 1500 ppm, or 800 ppm to 1200 ppm. The concentration of element $M^3$ in the positive electrode active material falling within the foregoing range can better stabilize the structure of the positive electrode active material and reduce the surface activity of the positive electrode active material.

The concentration of element $M^1$ in the positive electrode active material optionally ranges from 100 ppm to 3000 ppm. Optionally, the concentration of element $M^1$ in the positive electrode active material is greater than or equal to 100 ppm, 300 ppm, 400 ppm, 700 ppm, 1000 ppm, 1300 ppm, 1500 ppm, 1800 ppm, or 2000 ppm. Optionally, the concentration of element $M^1$ in the positive electrode active material is less than or equal to 2100 ppm, 2200 ppm, 2500 ppm, 2700 ppm, 3000 ppm, or the like. Further optionally, the concentration of element $M^1$ in the positive electrode active material ranges from 1000 ppm to 2500 ppm, 1500 ppm to 2200 ppm, or 1800 ppm to 2200 ppm. The concentration of element $M^1$ in the positive electrode active material falling within the above range can better separate the matrix particle from the electrolyte, reduce side reactions at the positive electrode, and ensure that the positive electrode active material has a good lithium ion diffusion capability.

The concentrations of element $M^1$, element $M^3$, and element X in the positive electrode active material falling within the foregoing ranges can also effectively prevent the coating layer from falling off during cycling and storage, so that the coating layer fully plays its role.

The concentrations of element $M^2$, element $M^3$, and element X in the positive electrode active material fall within the foregoing ranges, helping the matrix particle maintain a good layered crystal structure and reducing heterogeneous phases. In addition, the concentration of element $M^1$ in the positive electrode active material is controlled within the foregoing range to ensure that the positive electrode active material provides good carriers for deintercalation of lithium ions. This is beneficial to intercalation and deintercalation of lithium ions, and prevents reversible lithium ions from being consumed by the electrode surface or the electrolyte to effectively reduce the irreversible capacity, so that the positive electrode active material has a high initial capacity and cycling capacity retention rate, thereby improving the energy density, high-temperature cycling performance, and high-temperature storage performance of the battery.

The foregoing ppm (parts per million) is a mass ratio of an element in the positive electrode active material to the positive electrode active material in part per million.

The concentrations of element $M^1$, element $M^2$, element $M^3$, and element X in the positive electrode active material can all be obtained by testing spectral absorption of a positive electrode active material solution, for example, ICP (Inductive Coupled Plasma Emission Spectrometer, inductive coupled plasma emission spectrometer) or XAFS (X-ray absorption fine structure spectroscopy, X-ray absorption fine structure spectroscopy).

In some embodiments, the thickness T of the coating layer optionally ranges from 0.001 μm to 0.5 μm, such as 0.05 μm to 0.4 μm, or 0.2 μm to 0.3 μm. The thickness T of the coating layer falling within the foregoing range can effectively prevent the electrolyte coming into contact with the matrix particles, reduce side reactions, and enable lithium ions to have great diffusion and migration capabilities in the positive electrode active material.

In some optional embodiments, the thickness T of the coating layer and an average particle size $\overline{D}$ of the positive electrode active material satisfies: $0.002 \leq T/\overline{D} \leq 0.031$, optionally, $0.005 \leq T/\overline{D} \leq 0.02$, and further optionally, $0.01 \leq T/\overline{D} \leq 0.02$. The positive electrode active material satisfying the above conditions can effectively reduce side reactions of the electrolyte on the surface of the positive electrode active material, and further improve the diffusion capacity of lithium ions in the positive electrode active material.

The thickness of the coating layer may be determined by using a common method in the art. For example, a cross section polisher (for example, an IB-09010CP argon ion cross section polisher made by Japan Electron Optics Laboratory (JEOL) may be used to prepare a cross section of the positive electrode active material particle. The cross section runs through the core of the positive electrode active material particle. Then an element distribution diagram for the cross section is obtained through EDX or EDS element analysis in combination with TEM or SEM (for example, an X-Max EDS made by Oxford Instruments in the UK together with a Sigma-02-33 SEM made by German ZEISS) plane scanning, so as to obtain the thickness of the coating layer based on element distribution in the cross section. More accurately, thicknesses of the coating layer at multiple (3 or more, such as 8, 10, or 12) locations on the section may be tested, and an average value is recorded as the thickness of the coating layer.

The average particle size $\overline{D}$ of the positive electrode active material is an average value of diameters of the positive electrode active material particle in multiple orientations. For example, an element distribution diagram for the cross section of the positive electrode active material particle may be obtained through the EDX or EDS element analysis in combination with TEM or SEM plane scanning, multiple (3 or more, such as 8, 10, or 12) diameters in different orientations may be obtained based on element distribution in the cross section, and an average value is recorded as the average particle size $\overline{D}$ of the positive electrode active material.

A volume average particle size $D_v50$ of the positive electrode active material optionally ranges from 8 μm to 20 μm, further optionally, 10 μm to 18 μm, and further optionally, 12 μm to 16 μm. The $D_v50$ of the positive electrode active material falling within the above range can further improve migration and diffusion performance of lithium ions and electrons in the solid particles, reduce side reactions of the electrolyte on the surface of the particle, and inhibit particle agglomeration, thereby improving the cycling performance and rate performance of the battery. In addition, the $D_v50$ of the positive electrode active material falling within the above range also enables the positive electrode active material to have high compacted density, and increase the energy density of the battery.

In some optional embodiments, when the positive electrode active material is in a 78% delithiated state, an average valence of element $M^2$ is α; when the positive electrode active material is in an 11% delithiated state, an average valence of element $M^2$ is $\beta$; and $\alpha$ and $\beta$ satisfy: $\alpha \geq \beta \geq +3$.

A valence state of element $M^2$ in the positive electrode active material is +3 or more in the "78% delithiated state". For example, $\alpha$ is one of +3, +4, +5, +6, +7, and +8, and optionally, one or more of +4, +5, +6, +7, and +8. The valence state of element $M^2$ in the positive electrode active material is high in the "78% delithiated state". In this case, element $M^2$ can better keep an oxygen atom in an original lattice position, preventing the positive electrode active material from releasing oxygen during heating and high-temperature cycling processes after delithiation, and inhibiting an irreversible structural phase change, thereby further improving the structural stability and high-temperature cycling stability of the positive electrode active material. In addition, element $M^2$ can provide many electrons in the positive electrode active material, thereby making the structure of the positive electrode active material more stable and reducing the surface activity of the positive electrode active material. Therefore, both the high-temperature cycling performance and high-temperature storage performance of the battery can be improved.

It can be understood that in the positive electrode active material in the "78% delithiated state" and "11% delithiated state", the valence state of element $M^2$ may remain unchanged, that is, $\alpha = \beta \geq +3$, and element $M^2$ does not participate in redox reaction in the charging process of the battery. Element $M^2$ contributes many electrons to the positive electrode active material, so that initial valence states of nickel and cobalt are low, and many electrons can be released in the charging process of the battery, enabling the positive electrode active material to release more lithium ions, and hence improving the capacity performance and energy density of the battery.

Element $M^2$ in the positive electrode active material may alternatively participate in redox reaction in the charging process of the battery, so that $\alpha > \beta \geq +3$. That is, element $M^2$ has two or more stable valence states, and is in a lower average valence state in the positive electrode active material before delithiation. However, in the charging process of the battery, element $M^2$ contributes electrons to the positive electrode active material and has a higher average valence state. In the charging process of the battery, the electrons contributed by element $M^2$ cause charge compensation inside the material. This can increase the number of lithium ions that can be released from the positive electrode active material, thereby improving the capacity performance and energy density of the battery. In addition, element $M^2$ with a higher valence state can strengthen binding on oxygen atoms, improve the structural stability of the positive electrode active material, reduce the surface activity of the positive electrode active material, and improve the high-temperature cycling performance and high-temperature storage performance of the battery.

In this specification, "78% delithiated state" is a state in which molar mass of lithium released from the positive electrode active material accounts for 78% of theoretical lithium mass in the charging process of the battery. Similarly, "11% delithiated state" is a state in which molar mass of lithium released from the positive electrode active material accounts for 11% of theoretical lithium mass in the charging process of the battery. In actual use of lithium-ion secondary batteries, a "fully discharged state" and a "fully charged state" are generally set, and a "discharge cut-off voltage" and a "charge cut-off voltage" of the battery are set correspondingly to ensure use safety of the battery. The "discharge cut-off voltage" and "charge cut-off voltage" may vary with different positive electrode active materials or safety requirements. For secondary batteries made of a positive electrode active material of lithium nickel cobalt manganese oxide, a delithiated state of the positive electrode active material in a "fully discharged state" generally corresponds to the "11% delithiated state", and a delithiated state of the positive electrode active material in a "fully charged state" generally corresponds to the "78% delithiated state". When a battery is used in charge and discharge, a corresponding positive electrode active material works between the 11% delithiated state and 78% delithiated state to ensure normal use.

In this specification, mappings between "delithiated states" and "voltages" are used to obtain a positive electrode active material in the "11% delithiated state" and "78% delithiated state" for research. Specifically, the positive electrode active material is used to prepare a series of standard half button batteries, then these batteries are respectively charged to 2.8 V, 2.9 V, 3.0 V, 3.1 V, 3.2 V, 3.3 V, . . . , 4.0 V, 4.1 V, 4.2 V, 4.3 V, 4.4 V, and 4.5 V (that is, the charging voltage step is 0.1 V) at a rate of 0.1C, then positive electrode plates of the batteries are taken out and washed to remove electrolytes, and the positive electrode active materials are digested. Inductively coupled plasma-optical emission spectrometers (Inductively coupled plasma-Optical Emission spectrometers, ICP-OES) are used to test mass concentrations of element Li in the positive electrode active materials to calculate "delithiated states", and obtain mappings between charging voltages and the "delithiated states", so as to obtain charging voltages corresponding to the "11% delithiated state" and "78% delithiated state".

Then, the half batteries containing the positive electrode active material are charged to the voltage $U_1$ corresponding to the "11% delithiated state", so as to obtain the positive electrode active material in the "11% delithiated state". Similarly, the half batteries containing the positive electrode active material are charged to the voltage $U_2$ corresponding to the "78% delithiated state", so as to obtain the positive electrode active material in the "78% delithiated state".

The average valence of element $M^2$ of the positive electrode active material in the "11% delithiated state" and "78% delithiated state" may be obtained through X-ray photoelectron spectroscopy (XPS) test, or more accurately, synchrotron radiation photoelectron spectroscopy (Synchrotron radiation photoelectron spectroscopy, SRPES) test.

In some embodiments, the lithium nickel cobalt manganese oxide is a compound shown in chemical formula 1, and the positive electrode active material is the element $M^1$-containing oxide coating layer on the exterior surface of the matrix particle including the compound shown in chemical formula 1.

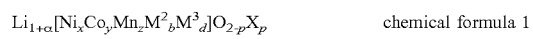

$$Li_{1+a}[Ni_xCo_yMn_zM^2{}_bM^3{}_d]O_{2-p}X_p \qquad \text{chemical formula 1}$$

In chemical formula 1, $M^2$ is a doping substitute for one or more of a nickel site, a cobalt site, and a manganese site of the matrix particle; $M^3$ is a doping substitute for one or more of a nickel site, a cobalt site, and a manganese site of the matrix particle; X is a substitute for an oxygen site of the matrix particle; and $0.5 \leq x < 1$, $0 < y < 0.3$, $0 < z < 0.3$, $-0.1 \leq a \leq 0.2$, $0 < b \leq 0.1$, $0 < d \leq 0.1$, $0 \leq p \leq 0.1$, and $x+y+z+b+d=1$. A battery using this kind of high-nickel ternary material can have high energy density, high-temperature cycling performance, and high-temperature storage performance.

Optionally, $0.6 \leq x \leq 0.95$, for example, $0.7 \leq x \leq 0.9$.

The volume average particle size $D_v50$ of the positive electrode active material has a meaning well known in the art, and is also referred to as a median particle size, meaning a particle size corresponding to 50% volume distribution of the positive electrode active material particle. The volume average particle size $D_v50$ of the positive electrode active material may be determined by using a common instrument and method in the art. For example, it may be conveniently determined with a laser particle size analyzer (for example, Mastersizer 3000 made by Malvern Panalytical in the UK).

The specific surface area of the positive electrode active material has a meaning well known in the art, and may be determined by using a common instrument and method in the art. For example, it may be tested by using a nitrogen-adsorption specific surface area analysis test method, and calculated by using a BET (Brunauer Emmett Teller) method, where the nitrogen-adsorption specific surface area analysis test may be carried out by using a NOVA 2000e specific surface area and aperture analyzer made by Quantachrome Instruments in the United States. In a specific example, the test method is as follows: 8.000 g to 15.000 g of positive electrode active materials are taken with a weighed empty sample tube, and well stirred and weighed; the sample tube is put into a NOVA 2000e degassing station for degassing; total mass of the degassed positive electrode active materials and the sample tube are weighed; and mass G of the degassed positive electrode active materials is calculated by subtracting mass of the empty sample tube from the total mass. The sample tube is put into NOVA 2000e to determine an adsorption amount of nitrogen on the surface of the positive electrode active materials under different relative pressures, and an adsorption amount of a monomolecular layer is calculated based on the Brunauer-Emmett-Teller multilayer adsorption theory and formula. Then a total surface area A of the positive electrode active materials is calculated, and a specific surface area of the positive electrode active materials is calculated from A/G.

Next, a preparation method for a positive electrode active material is exemplarily illustrated. According to this preparation method, any one of the foregoing positive electrode active materials can be prepared. The preparation method includes a preparation step S10 of substrate particle, a preparation step S20 of matrix particle, and a preparation step S30 of coating layer.

S10. Mix a nickel-cobalt-manganese ternary material precursor, a lithium source, and an element $M^2$ precursor, and perform sintering treatment, to obtain a substrate particle uniformly doped with element $M^2$.

The nickel-cobalt-manganese ternary material precursor is, for example, one or more of oxides, hydroxides, and carbonates that contain Ni, Co, and Mn, such as hydroxides containing Ni, Co, and Mn.

The nickel-cobalt-manganese ternary material precursor may be obtained by a method known in the art, for example, co-precipitation method, gel method, or solid phase method.

In an example of preparing a hydroxide containing Ni, Co, and Mn, a Ni source, a Co source, and an Mn source are dispersed in a solvent to obtain a mixed solution; in a manner of continuous cocurrent reaction, the mixed solution, a strong base solution, and a complexing agent solution are pumped into a stirring reactor, with the pH value of the reaction solution being controlled within 10 to 13, the temperature in the reaction kettle being 25° C. to 90° C., and the reaction process is protected by inert gas; and after the reaction is completed, aging, filtering, washing, and vacuum drying are performed to obtain a hydroxide containing Ni, Co and Mn.

The Ni source may be a soluble nickel salt, for example, one or more of nickel sulfate, nickel nitrate, nickel chloride, nickel oxalate, and nickel acetate, for another example, one or more of nickel sulfate and nickel nitrate, and for another example, nickel sulfate. The Co source may be a soluble cobalt salt, for example, one or more of cobalt sulfate, cobalt nitrate, cobalt chloride, cobalt oxalate and cobalt acetate, for another example, one or more of cobalt sulfate and nitric acid, and for another example, cobalt sulfate. The Mn source may be a soluble manganese salt, for example, one or more of manganese sulfate, manganese nitrate, manganese chloride, manganese oxalate and manganese acetate, for another example, one or more of manganese sulfate and manganese nitrate, and for another example, manganese sulfate.

The strong base may be one or more of LiOH, NaOH, and KOH, such as NaOH. The complexing agent may be one or more of ammonia, ammonium sulfate, ammonium nitrate, ammonium chloride, ammonium citrate, and disodium ethylenediaminetetraacetic acid (EDTA), for example, ammonia.

None of solvents of the mixed solution, the strong base solution, and the complexing agent solution is particularly limited. For example, the solvents of the mixed solution, the strong base solution, and the complexing agent solution are each independently one or more of deionized water, methanol, ethanol, aceton, isopropanol, and n-hexanol, for example, deionized water.

The inert gas introduced during the reaction is, for example, one or more of nitrogen, argon, and helium.

The lithium source may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$), and lithium nitrate ($LiNO_3$). Further, the lithium source is one or more of lithium carbonate, lithium hydroxide, and lithium nitrate. Further, the lithium source is lithium carbonate.

The element $M^2$ precursor may be one or more of oxides, nitrates, carbonates, bicarbonates, sulfates, chlorides, hydroxides and acetates of element $M^2$, which can be selected based on an actual need.

In step S10, a ball mill mixer or a high-speed mixer may be used to mix the materials to obtain a uniformly mixed mixture. For example, the nickel-cobalt-manganese ternary material precursor, the lithium source and the element $M^2$ precursor are added to a high-speed mixer for mixing, and the mixing duration may be 0.5 h to 3 h.

In step S10, the mixture may be added to an atmosphere sintering furnace for sintering. The sintering atmosphere is an oxygen-containing atmosphere, for example, an air atmosphere or an oxygen atmosphere. The sintering temperature is, for example, 600° C. to 1000° C., for another example, 650° C. to 950° C., and for another example, 700° C. to 900° C. This enables element $M^2$ to have high doping uniformity. The sintering duration can be adjusted according to an actual situation, for example, 5 h to 25 h, and for another example, 8 h to 20 h.

In some embodiments, the sintered product in step S10 may be crushed and sieved to obtain a positive electrode active material with an optimized particle size distribution and specific surface area. The crushing method is not specifically limited, and can be selected according to an actual need. For example, a particle crusher may be used.

S20. Mix the substrate particle obtained in step S10 with a modified-element precursor, and perform sintering treatment, to cause a modifying element to dope the substrate particle at a decreasing concentration from an exterior surface to a core of the substrate particle, to obtain a matrix particle, where the modifying element is element $M^3$ or a combination of element $M^3$ and element X.

In an example, step S201 may be used to prepare a matrix particle doped with element $M^3$. S201. Mix the substrate particle with an element $M^3$ precursor, and perform sintering treatment, to cause element $M^3$ to be doped into the substrate particle at a decreasing concentration from an exterior surface to a core of the substrate particle, to obtain a matrix particle.

The element $M^3$ precursor may be one or more of chlorides, sulfates, nitrates, oxides, hydroxides, fluorides, carbonates, bicarbonates, acetates, phosphates, dihydrogen phosphates, and organic compounds of element $M^3$, but are not limited thereto.

In step S201, a ball mill mixer or a high-speed mixer may be used to mix the materials. For example, the raw materials are added to a high-speed mixer for mixing, and the mixing duration may be 0.5 h to 3 h.

In step S201, the mixed materials may be added to an atmosphere sintering furnace for sintering. The sintering atmosphere is an oxygen-containing atmosphere, for example, an air atmosphere or an oxygen atmosphere. The sintering temperature is, for example, 600° C. to 950° C., and for another example, 600° C. to 800° C. The sintering duration may be 5 h to 25 h, for example, 5 h to 15 h.

In the sintering process of step S201, element $M^3$ diffuses from the exterior surface of the substrate particle to the bulk phase to a predetermined depth. Doping of element $M^3$ is carried out after complete lithiation, helping make element $M^3$ fall within the predetermined depth in the direction from the exterior surface to the core of the matrix particle, and make a decreasing concentration of element $M^3$ in the direction from the exterior surface to the core of the matrix particle.

In an example, step S202 may be used to prepare a matrix particle doped with element $M^3$ and element X. Step S202 is similar to step S201 except that an element X precursor is also added to the mixture.

S202. Mix the substrate particle with an element $M^3$ precursor and an element X precursor, and perform sintering treatment, to cause both element $M^3$ and element X to be doped into a substrate particle at a decreasing concentration from an exterior surface to a core of the substrate particle, to obtain matrix particle.

The element X precursor may be selected from one or more of ammonium and lithium salts of element X, for example, one or more of $NH_4F$, $NH_4Cl$, $NH_4Br$, $(NH_4)_2S$, LiF, LiCl, LiBr, and $Li_2S$.

In the sintering process of step S202, element $M^3$ and element X diffuse from the exterior surface of the substrate particle to the bulk phase to a predetermined depth. Similarly, doping of element $M^3$ and element X is carried out after complete lithiation, helping make element $M^3$ and element X fall within the predetermined depth in the direction from the exterior surface to the core of the matrix particle, and make element $M^3$ and element X have a decreasing concentration in the direction from the exterior surface to the core of the matrix particle.

Other features of step S202 may be the same as step S201, and are not be repeated herein.

S30. Mix the matrix particle with an element $M^1$ precursor, and perform sintering treatment, to form an element $M^1$-containing oxide coating layer on an exterior surface of the matrix particle, so as to obtain a positive electrode active material.

The element $M^1$ precursor may be one or more of chlorides, sulfates, nitrates, oxides, hydroxides, fluorides, carbonates, bicarbonates, acetates, phosphates, dihydrogen phosphates, and organic compounds of element $M^1$, but are not limited thereto.

In step S30, a ball mill mixer or a high-speed mixer may be used to mix the materials. For example, the matrix particle and the element $M^1$ precursor are added to a high-speed mixer for mixing, and the mixing duration is 0.5 h to 3 h.

In step S30, the mixed materials may be added to an atmosphere sintering furnace for sintering. The sintering atmosphere is an oxygen-containing atmosphere, for example, an air atmosphere or an oxygen atmosphere. The sintering temperature is, for example, 150° C. to 500° C., and for another example, 200° C. to 450° C. The sintering duration may be 3 h to 25 h. for example, 5 h to 10 h. Due to the low sintering temperature, the oxides of element $M^1$ are not easy to diffuse into the matrix particle, but form the coating layer covering the exterior surface of the matrix particle instead. Element $M^1$ matches the surface lattice of the matrix particle, so that the coating layer and the matrix particle are closely bonded, and the coating layer does not damage the structure of the matrix particle, so that the coating layer can reliably protect the matrix particle.

Positive Electrode Plate

This application provides a positive electrode plate, and the positive electrode plate uses any one or more positive electrode active materials in this application.

The positive electrode plate in this application uses the positive electrode active material in this application. Therefore, the lithium-ion secondary battery can have good room-temperature and high-temperature cycling performance, good high-temperature storage performance, and high energy density.

Specifically, the positive electrode plate includes a positive electrode current collector and a positive electrode active substance layer disposed on at least one surface of the positive electrode current collector. For example, the positive electrode current collector includes two opposite surfaces in its thickness direction, and the positive electrode active substance layer is laminated on either or both of the two surfaces of the positive electrode current collector.

The positive electrode active substance layer includes the positive electrode active material in this application.

In addition, the positive electrode active substance layer may further include a conductive agent and a binder. This application does not specifically limit the type of the conductive agent and binder in the positive electrode active substance layer, and they can be selected according to an actual need.

For example, the conductive agent may be one or more of graphite, superconducting carbon, acetylene black, carbon black, Ketjen black, carbon dot, carbon nanotube, graphene, and carbon nanofiber. The binder may be one or more of styrene butadiene rubber (SBR), water-based acrylic resin (water-based acrylic resin), carboxymethyl cellulose (CMC), polyvinylidene fluoride (PVDF), polytetrafluoroethylene (PTFE), polyvinyl butyral (PVB), ethylene-vinyl acetate copolymer (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin, and polyvinyl alcohol (PVA).

The positive electrode current collector may be metal foil or a porous metal plate with good electrical conductivity and mechanical performance, and may be made of one or more of aluminum, copper, nickel, titanium, silver, and alloys thereof. The positive electrode current collector is, for example, aluminum foil.

The positive electrode plate may be prepared according to a conventional method in the art. For example, the positive electrode active material, the conductive agent, and the binder are dispersed in a solvent to form a uniform positive electrode slurry, where the solvent may be N-methylpyrrolidone (NMP). The positive electrode slurry is applied on the positive electrode current collector, and then processes such as drying and roll-in are performed to obtain a positive electrode plate.

Lithium-Ion Secondary Battery

This application provides a lithium-ion secondary battery. The lithium-ion battery includes a positive electrode plate, a negative electrode plate, a separator, and an electrolyte, where the positive electrode plate is any positive electrode plate in this application.

The lithium-ion secondary battery uses the positive electrode plate in this application, and therefore can have good room-temperature and high-temperature cycling performance, high energy density, and good high-temperature storage performance.

The negative electrode plate may be a lithium metal plate.

The negative electrode plate may further include a negative electrode current collector and a negative electrode active substance layer disposed on at least one surface of the negative electrode current collector. For example, the negative electrode current collector includes two opposite surfaces in its thickness direction, and the negative electrode active substance layer is laminated on either or both of the two surfaces of the negative electrode current collector.

The negative electrode active substance layer includes a negative electrode active material. The embodiments of this application do not specifically limit the type of the negative electrode active material, and it can be selected according to an actual need. For example, the negative electrode active material may be one or more of natural graphite, artificial graphite, mesocarbon microbead (MCMB), hard carbon, soft carbon, silicon, silicon-carbon composite, $SiO_m$ ($0<m<2$, for example m=1), Li—Sn alloy, Li—Sn—O alloy, Sn, SnO, $SnO_2$, spinel-structure lithium titanate $Li_4Ti_5O_{12}$, Li—Al alloy, and metal lithium.

The negative electrode active substance layer may further include a conductive agent and a binder. The embodiments of this application do not specifically limit the types of the conductive agent and binder in the negative electrode active substance layer, and they can be selected according to an actual need. For example, the conductive agent is one or more of graphite, superconducting carbon, acetylene black, carbon black, Ketjen black, carbon dot, carbon nanotube, graphene, and carbon nanofiber. The binder is one or more of styrene butadiene rubber (SBR), polyvinylidene fluoride (PVDF), polytetrafluoroethylene (PTFE), polyvinyl butyral (PVB), and water-based acrylic resin (water-based acrylic resin).

The negative electrode active substance layer may further optionally include a thickener, such as sodium carboxymethyl cellulose (CMC-Na).

The negative electrode current collector may be metal foil or a porous metal plate with good electrical conductivity and mechanical performance, and may be made of one or more of copper, nickel, titanium, iron, and alloys thereof. The negative electrode current collector is, for example, copper foil.

The negative electrode plate may be prepared by using a conventional method in the art. For example, the negative electrode active substance, the conductive agent, the binder, and the thickener are dispersed in a solvent to form a uniform negative electrode slurry, where the solvent may be N-methylpyrrolidone (NMP) or deionized water. The negative electrode slurry is applied on the negative electrode current collector, and then processes such as drying and roll-in are performed to obtain a negative electrode plate.

In the lithium-ion secondary battery in the embodiments of this application, the electrolyte may be a solid electrolyte, such as a polymer electrolyte or an inorganic solid electrolyte, but is not limited thereto. The electrolyte may alternatively be a liquid electrolyte. The foregoing electrolyte includes a solvent and a lithium salt dissolved in the solvent.

For example, the solvent may be a non-aqueous organic solvent, for example, one or more, or for another example, two or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB), and ethyl butyrate (EB).

The lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)bisfluorosulfonyl imide), LiTFSI (lithium bis-trifluoromethanesulfonimidetrifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate), for example, one or more of $LiPF_6$ (lithium hexafluorophosphate), $LiBF_4$ (lithium tetrafluoroborate), LiBOB (lithium bisoxalatoborate), LiDFOB (lithium difluorooxalatoborate), LiTFSI (lithium bis-trifluoromethanesulfonimidetrifluoromethanesulfon imide), and LiFSI (lithium bis(fluorosulfonyl)bisfluorosulfonyl imide).

The electrolyte may further optionally include other additives, such as one or more of vinylene carbonate (VC), vinyl ethylene carbonate (VEC), fluoroethylene carbonate (FEC), difluoroethylene carbonate (DFEC), 3,3,3-trifluoropropylene carbonate (TFPC), succinonitrile (SN), adiponitrile (ADN), glutaronitrile (GLN), hexanetrinitrile (HTN), 1,3-propane sultone (1,3-PS), ethylene sulfate (DTD), methylene methyl disulfonate (MMDS), 1-propene-1,3-sultone (PST), 4-methylvinyl sulfate (PCS), 4-ethyl ethylene sulfate (PES), 4-propyl ethylene sulfate (PEGLST), trimethylene sulfate (TS), 1,4-butane sultone (1,4-BS), dioxathiolane 2-oxide (DTO), dimethyl sulfite (DMS), diethyl sulfite (DES), sulfonate cyclic quaternary ammonium salt, tris (trimethylsilyl)phosphate (TMSP), and tris(trimethylsiloxy) boron (TMSB), but is not limited thereto.

In the lithium-ion secondary battery in the embodiments of this application, there is no particular limitation on the separator, and any common porous separators with electrochemical and mechanical stability can be selected, for example, mono-layer or multi-layer membranes made of one or more of glass fiber, non-woven fabric, polyethylene (PE), polypropylene (PP), and polyvinylidene fluoride (PVDF).

The positive electrode plate and the negative electrode plate are alternately stacked, and the separator is disposed between the positive electrode plate and the negative electrode plate for isolation, to obtain a battery cell, or the stack may be wound to obtain a battery cell. The battery cell is placed in a housing, and the electrolyte is injected, followed by sealing, to obtain a lithium-ion secondary battery.

Figure 5:
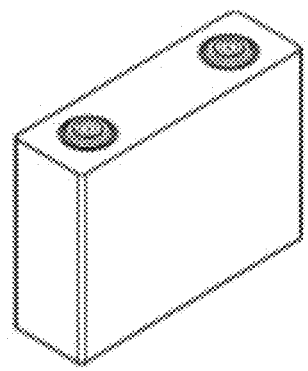
FIG. 5 is a schematic diagram of an embodiment of a lithium-ion secondary battery.

This application does not impose special limitations on a shape of the lithium-ion secondary battery, and the lithium-ion secondary battery may be of a cylindrical shape, a square shape, or any other shapes. FIG. 5 shows a lithium-ion secondary battery 5 of a square structure as an example.

In some embodiments, the secondary battery may include an outer package. The outer package is used for packaging the positive electrode plate, the negative electrode plate, and the electrolyte.

Figure 6:
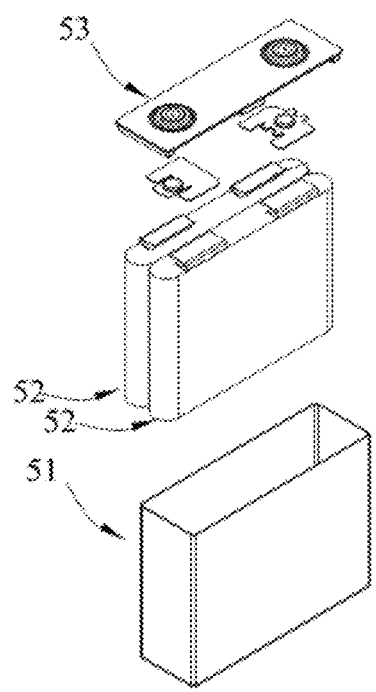
FIG. 6 is an exploded view of FIG. 5.

In some embodiments, as shown in FIG. 6, the outer package may include a housing 51 and a cover plate 53. The housing 51 may include a base plate and a side plate connected to the base plate, where the base plate and the side plate form an accommodating cavity through enclosure. The housing 51 has an opening communicating with the accommodating cavity, and the cover plate 53 can cover the opening to close the accommodating cavity.

The positive electrode plate, the negative electrode plate, and the separator may be wound or laminated to form a battery cell 52. The battery cell 52 is encapsulated in the accommodating cavity. The electrolyte may be a liquid electrolyte, and the liquid electrolyte infiltrates the battery cell 52. There may be one or more battery cells 52 included in the lithium-ion secondary battery 5, and the number may be adjusted based on an actual need.

In some embodiments, the outer package of the lithium-ion secondary battery may be a hard shell, for example, a hard plastic shell, an aluminum shell, or a steel shell. The outer package of the secondary battery may alternatively be a soft package, for example, a soft bag. A material of the soft package may be plastic, including, for example, one or more of polypropylene (PP), polybutylene terephthalate (PBT), and polybutylene succinate (PBS).

In some embodiments, the lithium-ion secondary battery may be assembled into a battery module, and the battery module may include a plurality of lithium-ion secondary batteries. The specific number may be adjusted based on a use case and capacity of the battery module.

Figure 7:
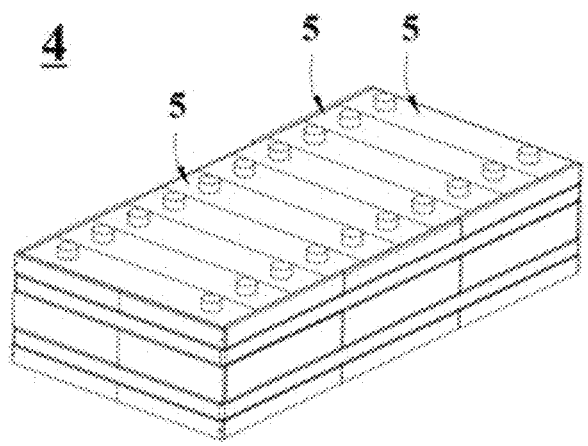
FIG. 7 is a schematic diagram of an embodiment of a battery module.

FIG. 7 shows a battery module 4 as an example. As shown in FIG. 7, in the battery module 4, a plurality of lithium-ion secondary batteries 5 may be sequentially arranged in a length direction of the battery module 4. Certainly, the lithium-ion secondary batteries may alternatively be arranged in any other manner. Further, the plurality of lithium-ion secondary batteries 5 may be fixed by using fasteners.

Optionally, the battery module 4 may further include a housing with an accommodating space, and the plurality of lithium-ion secondary batteries 5 are accommodated in the accommodating space.

In some embodiments, the battery module may be further assembled into a battery pack, and the number of battery modules included in the battery pack may be adjusted based on a use case and capacity of the battery pack.

Figure 8:
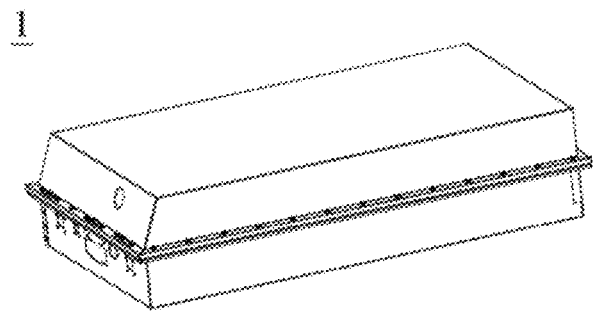
FIG. 8 is a schematic diagram of an embodiment of a battery pack.
Figure 9:
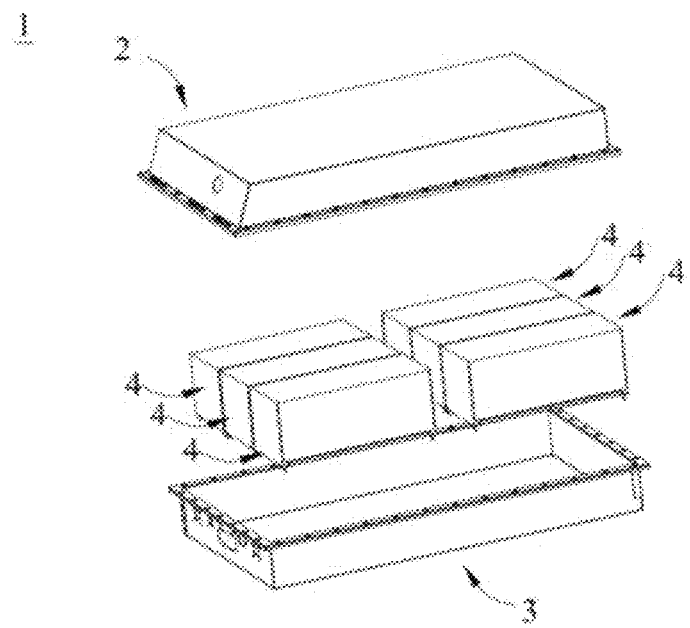
FIG. 9 is an exploded view of FIG. 8.

FIG. 8 and FIG. 9 show a battery pack 1 as an example. Referring to FIG. 8 and FIG. 9, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

This application further provides an apparatus. The apparatus includes at least one of the lithium-ion secondary battery, the battery module, or the battery pack in this application. The lithium-ion secondary battery, the battery module, or the battery pack may be used as a power source for the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The lithium-ion secondary battery, the battery module, or the battery pack may be selected for the apparatus based on a use requirement of the apparatus.

Figure 10:
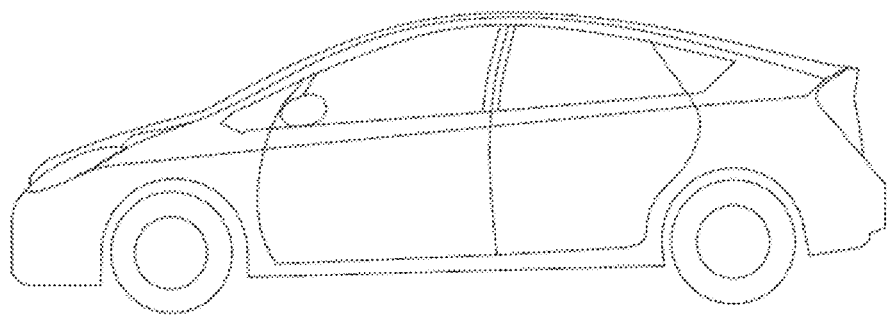
FIG. 10 is a schematic diagram of an embodiment of an apparatus using a lithium-ion secondary battery as a power source.

FIG. 10 shows an apparatus as an example. The apparatus is a battery electric vehicle, a hybrid electric vehicle, a plug-in hybrid electric vehicle, or the like. To meet a requirement of the apparatus for high power and high energy density of a secondary battery, the battery pack or the battery module may be used.

In another example, the apparatus may be a mobile phone, a tablet computer, a notebook computer, or the like. The apparatus is generally required to be light and thin, and may use the lithium-ion secondary battery as a power source.

EXAMPLES

Content disclosed in this application is described in more detail in the following examples. These examples are intended only for illustrative purposes because various modifications and changes made without departing from the scope of the content disclosed in this application are apparent to those skilled in the art. Unless otherwise stated, all proportions, percentages, and ratios reported in the following embodiments are based on weights, all reagents used in the embodiments are commercially available or synthesized in a conventional manner, and can be used directly without further processing, and all instruments used in the embodiments are commercially available.

Example 1

Preparation of a Positive Electrode Active Material (1) A nickel-cobalt-manganese ternary material precursor $[Ni_{0.8}Co_{0.1}Mn_{0.1}](OH)_2$, lithium hydroxide LiOH, and antimony trioxide $Sb_2O_3$ were added to a high-speed mixer for mixing for 1 h, to obtain a mixture. A molar ratio of the nickel-cobalt-manganese ternary material precursor to lithium hydroxide Li/Me was 1.05, and Me represented total molar mass of Ni, Co, and Mn in the nickel-cobalt-manganese ternary material precursor. A proper amount of $Sb_2O_3$ was added so that a concentration of Sb in the positive electrode active material was 3014 ppm. The mixture was put into an atmosphere sintering furnace for sintering. The sintering temperature was 830° C., the sintering atmosphere was an oxygen-containing atmosphere with an $O_2$ concentration of 90%, and the sintering duration was 15 h. A substrate particle was obtained after crushing and sieving. Sb was uniformly mixed in the bulk structure of the substrate particle.

(2) The substrate particle, alumina $Al_2O_3$, and lithium fluoride LiF were added to a high-speed mixer for mixing for 1 h. A proper amount of $Al_2O_3$ was added so that a concentration of Al in the matrix particle was 1027 ppm, which was equal to the concentration of Al in the positive electrode active material. A proper amount of LiF was added so that a concentration of F in the positive electrode active material was 2986 ppm. The mixed materials were put into the atmosphere sintering furnace for sintering. The sintering temperature was 700° C., the sintering atmosphere was an oxygen-containing atmosphere with an $O_2$ concentration of 90%, and the sintering duration was 15 h. so that the substrate particle was doped with Al and F to obtain a matrix particle. Elements Al and F both had a decreasing concentration from an exterior surface to a core of the matrix particle.

(3) The matrix particle and alumina $Al_2O_3$ were added to the high-speed mixer for mixing for 1 h. A proper amount of $Al_2O_3$ was added so that an Al concentration of a coating layer was 2034 ppm, which was equal to a concentration of Al in the positive electrode active material. The mixed materials were put into the atmosphere sintering furnace for sintering. The sintering temperature was 420° C., the sintering atmosphere was an oxygen-containing atmosphere with an $O_2$ concentration of 90%, and the sintering duration was 8 h, so that an $Al_2O_3$ coating layer was formed on the exterior surface of the matrix particle to obtain a positive electrode active material. An average particle size $D_v50$ of the positive electrode active material was 15 pam, and a thickness T of the coating layer was 0.201 μm.

Preparation of an Electrolyte

EC, DEC, and DMC were mixed at a volume ratio of 1:1:1 to obtain a solvent, and then a lithium salt $LiPF_6$ was dissolved in the solvent to obtain an electrolyte, where a concentration of $LiPF_6$ was 1 mol/L.

Preparation of a Button Battery

The above prepared positive electrode active material, conductive carbon black, and a binder PVDF were dispersed in a solvent N-methylpyrrolidone (NMP) at a weight ratio of 90:5:5 and well mixed to obtain a positive electrode slurry. The positive electrode slurry was uniformly applied on a positive electrode current collector aluminum foil, followed by drying and cold pressing, to obtain a positive electrode plate.

In a button box, the positive electrode plate, a separator, and a lithium metal plate were stacked in sequence, and the foregoing electrolyte was injected, to obtain a button battery.

Preparation of a Full Battery

The above prepared positive electrode active material, a conductive agent acetylene black, and a binder PVDF were dispersed in a solvent NMP at a weight ratio of 94:3:3 and well mixed to obtain a positive electrode slurry. The positive electrode slurry was uniformly applied on a positive electrode current collector aluminum foil, followed by drying and cold pressing, to obtain a positive electrode plate.

A negative electrode active material artificial graphite, hard carbon, a conductive agent acetylene black, a binder styrene butadiene rubber (SBR), and a thickener sodium carboxymethyl cellulose (CMC) were dispersed in deionized water at a weight ratio of 90:5:2:2:1 and well mixed to obtain a negative electrode slurry. The negative electrode slurry was applied on a negative electrode current collector aluminum foil, followed by drying and cold pressing, to obtain a negative electrode plate.

A polyethylene (PE) porous polymer film was used as a separator. The positive electrode plate, the separator, and the negative electrode plate were laminated in turn, to obtain a bare cell. The bare cell was placed in an outer package; and the foregoing electrolyte was injected, followed by processes such as formation, to obtain a full battery.

Examples 2 to 35 and Comparative Examples 1 to 9

The difference from Example 1 is that relevant parameters in preparation steps of the positive electrode active material were changed to obtain a positive electrode active material with predetermined parameter characteristics. Details are shown in Table 1-1 to Table 1-2.

Precursors for positive electrode active materials in Examples 2 to 31 and Comparative Examples 1 to 5 were all $[Ni_{0.8}Co_{0.1}Mn_{0.1}](OH)_2$. Precursors for positive electrode active materials in Examples 32 to 35 and Comparative Examples 6 to 9 were all $[Ni_{0.8}Co_{0.2}Mn_{0.3}(OH)_2$. In Table 1-1 and Table 1-2:

Element $M^2$ precursors in Example 2, Example 10, and Example 33 were $TiO_2$; element $M^2$ precursors in Example 3 and Examples 11 to 14 were $NbO_2$; an element $M^2$ precursor in Example 4 was $ZrO_2$; an element $M^2$ precursor in Example 5 was $RuO_2$; an element $M^2$ precursor in Example 6 was $GeO_2$; element $M^2$ precursors in Example 7 and Examples 22 to 24 were $WO_2$; and element $M^2$ precursors in Example 8 and Example 34 were $Sb_2O_3$ and $WO_2$, and percentages of the two precursors were basically the same;

different from Example 1, precursors of doping element $M^3$ and coating element $M^1$ were selected from $B_2O_3$, $ZrO_2$, and $TiO_2$;

in Example 25, the sintering temperature was 680° C. and the sintering duration was 5 h in step (1); the sintering temperature was 650° C. and the sintering duration was 10 h in step (2); and the sintering temperature was 380° C. and the sintering duration was 10 h in step (3);

in Example 26, the sintering temperature was 750° C. and the sintering duration was 11 h in step (1); the sintering temperature was 620° C. and the sintering duration was 8 h in step (2); and the sintering temperature was 310° C. and the sintering duration was 8 h in step (3);

in Example 27, the sintering temperature was 740° C. and the sintering duration was 10 h in step (1); the sintering temperature was 610° C. and the sintering duration was 7 h in step (2); and the sintering temperature was 300° C. and the sintering duration was 7 h in step (3);

in Example 28, the sintering temperature was 880° C. and the sintering duration was 16 h in step (1); the sintering temperature was 690° C. and the sintering duration was 14 h in step (2); and the sintering temperature was 210° C. and the sintering duration was 9 h in step (3);

in Example 29, the sintering temperature was 710° C. and the sintering duration was 9 h in step (1); the sintering temperature was 670° C. and the sintering duration was 12 h in step (2); and the sintering temperature was 450° C. and the sintering duration was 13 h in step (3);

in Example 30, the sintering temperature was 930° C. and the sintering duration was 19 h in step (1); the sintering temperature was 690° (C and the sintering duration was 15 h in step (2); and the sintering temperature was 180° C. and the sintering duration was 4 h in step (3);

in Example 31, the sintering temperature was 720° C. and the sintering duration was 10 h in step (1); the sintering temperature was 660° C. and the sintering duration was 12 h in step (2); and the sintering temperature was 510° C. and the sintering duration was 24 h in step (3);

in Comparative Example 5, the sintering temperature was 660° C. and the sintering duration was 3 h in step (1); the sintering temperature was 640° C. and the sintering duration was 8 h in step (2); and the sintering temperature was 350° C. and the sintering duration was 8 h in step (3);

in Examples 32 to 35 and Comparative Examples 6 to 9, the sintering temperature was 770° (C and the sintering duration was 13 h in step (1); the sintering temperature was 680° C. and the sintering duration was 13 h in step (2); and the sintering temperature was 380° C. and the sintering duration was 7 h in step (3);

element $M^2$ was not used for doping in Comparative Example 1, Comparative Example 2, Comparative Example 6, and Comparative Example 7; element $M^3$ was not used for doping in Comparative Example 1, Comparative Example 3, Comparative Example 6, and Comparative Example 8; element $M^1$ was not used for coating in Comparative Example 1, Comparative Example 4, Comparative Example 6, and Comparative Example 9; and element X was not used for doping in Example 9, Example 10, Example 23, Example 35, Comparative Example 1, and Comparative Example 6.

σ represented the relative deviation of the local mass concentration of element $M^2$ in the matrix particle.

Concentrations of element $M^1$, element $M^2$, element $M^3$ and element X were concentrations in the positive electrode active material.

A concentration ratio represented a concentration ratio of element $M^1$ to element $M^3$ in the positive electrode active material.

Figure 4:
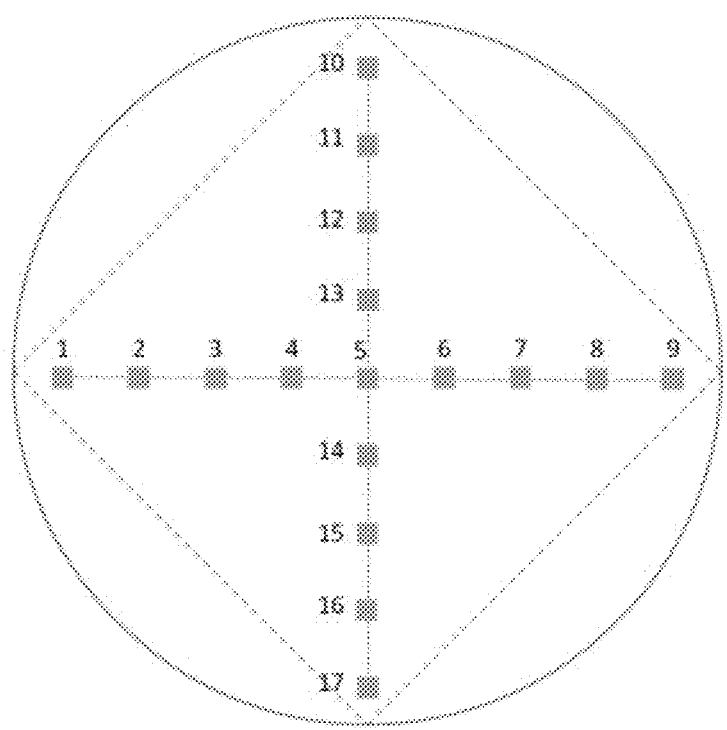
FIG. 4 is a schematic diagram of relative deviation test positions of a local mass concentration of element $M^2$ in a matrix particle in Examples 1 to 35 and Comparative Examples 1 to 9.

Tests (1) Relative Deviation Test for a Local Mass Concentration of Element $M^2$ in a Matrix Particle A 2 g positive electrode active material powder sample was taken. The sample was uniformly sprinkled on a sample stage with conductive glue, and then was lightly pressed to fix the powder. Alternatively, a 1 cm×1 cm electrode plate was cut from a battery positive electrode plate, and pasted as a to-be-tested sample on a sample stage. The sample stage was put into and fastened in a vacuum sample chamber. An IB-09010CP cross section polisher made by Japan Electron Optics Laboratory (JEOL) was used to prepare a cross section of a positive electrode active material particle, that is, a cross section of a matrix particle, as shown in FIG. 3. Totally 17 sites of the particle cross section were taken, as shown in FIG. 4, with each site having an area of 20 nm×20 nm. An X-Max energy spectrometer (EDS) made by Oxford Instruments in the UK and a Sigma-02-33 scanning electron microscope (SEM) made by ZEISS in Germany were used to test mass concentrations of element $M^2$ at the 17 sites. The test method was as follows: Elements Li, O, Ni, Co, Mn, and doping elements were selected for testing; SEM parameters were set as follows: 20 kV for acceleration voltage, 60 μm for aperture, 8.5 mm for working distance, and 2.335 A for current; the EDS test did not stop until a spectrum area reached 250000 cts or above (which was controlled by a collection time and collection rate); and data was collected to obtain the mass concentrations of element $M^2$ at all sites, which were respectively denoted as $\eta_1, \eta_2, \eta_3, \ldots,$ and $\eta_{17}$.

The method for determining an average mass concentration $\bar{\eta}$ of element $M^2$ in the matrix particle: The foregoing EDS-SEM test method was used to test all sites for point scanning of the matrix particle, where these sites were all within the cross section of the matrix particle, as shown in the dashed box in FIG. 4.

Then the relative deviation v of the local mass concentration of element $M^2$ in the matrix particle was calculated according to formula (1).

(2) Determination of Concentrations of Element $M^1$, Element $M^2$, Element M. And Element X in the Positive Electrode Active Material They were determined by using an Optima 7000DV inductively coupled plasma optical emission spectrometer (Inductively Coupled Plasma Optical Emission Spectrometer, ICP-OES for short) made by PerkinElmer (PE for short) in the United States as follows:

About 5 g of positive electrode active material powder was taken and put into a digestion tank. Alternatively, a full battery that has undergone formation and capacity test was discharged to 2.80 V at 0.33C, and was cut open with a pair of scissors in a drying room to take out an entire middle part of a positive electrode plate; the middle part was put into a beaker, and an appropriate amount of highly pure anhydrous dimethyl carbonate DMC was added, and replaced every 8 hours; the positive electrode plate was cleaned for three consecutive times, then put into a vacuum standing box in the drying room, and dried for 12 hours in a vacuumed state (−0.096 MPa); and powder was scrapped from the dried positive electrode plate in the drying room with a blade, and about 5 g of positive electrode active material powder was taken and put into a digestion tank.

The digestion tank containing the positive electrode active material sample was weighed with a precision of 0.0001 g; 10 mL of aqua regia (a mixture of concentrated hydrochloric acid and concentrated nitric acid in a volume ratio of 3:1) was slowly added as a digestion reagent, and was put in a MARS6 microwave digestion instrument made by CEM in the United States, and a microwave emission frequency was adjusted to 2450 Hz to digest the sample; the digested liquid sample was transferred to an atomization chamber, an RF frequency was set to 40.68 MHz, an argon output pressure was set to 0.6 MPa, and a radio frequency power was set to 1300 W to test the sample to obtain a characteristic spectrum; and an element type was determined based on a wavelength of the characteristic spectrum of the tested element, and an element concentration was determined based on intensity of the characteristic spectrum.

(3) Determination of $\omega_1$ and $\omega_2$

The positive electrode active material particle was taken, and an IB-09010CP cross section polisher made by Japan Electron Optics Laboratory (JEOL) was used to prepare a cross section of the positive electrode active material particle (as shown in FIG. 3). An X-Max energy spectrometer (EDS) made by Oxford Instruments in the UK and a Sigma-02-33 scanning electron microscope (SEM) made by ZEISS in Germany were used for testing to obtain an element distribution diagram from the cross section. The test method was as follows: Elements $M^1$, $M^3$, and X were selected for testing; SEM parameters were set as follows: 20 kV for acceleration voltage, 60 μm for aperture, 8.5 mm for working distance, and 2.335 A for current; the EDS test did not stop until a spectrum area reached 250000 cts or above (which was controlled by a collection time and collection rate), and data was collected; a percentage $\omega_1$ and a percentage $\omega_2$ were obtained based on element distribution, where $\omega_1$ is a percentage of a sum of mass of elements $M^1$, $M^3$, and X within a thickness range of ⅕ of a particle size of the particle the positive electrode active material from an exterior surface to a core of a particle of the positive electrode active material (that is, a range from the exterior surface of the particle to outer dashed line 1) in total mass of the elements $M^1$, $M^3$, and X in the positive electrode active material particle, and $\omega_2$ is a percentage of a sum of mass of elements $M^1$, $M^3$, and X within a thickness range of ⅔ of the particle size of the positive electrode active material in the direction from the exterior surface to the core of the positive electrode active material particle (that is, a range from the exterior surface of the particle to inner dashed line 2) in the total mass of elements $M^1$, M, and X in the positive electrode active material particle.

In any direction of the cross section of the particle, a thickness $r_1$ from the exterior surface of the particle to outer dashed line 1 was ⅕ of a radius R of the positive electrode active material particle in this direction, and a thickness $r_2$ from the exterior surface of the particle to inner dashed line 2 was ⅔ of the radius R of the positive electrode active material particle in this direction.

(4) Determination of T/$\overline{D}$, the Ratio of a Thickness T of a Coating Layer to an Average Particle Size $\overline{D}$ of the Positive Electrode Active Material An element distribution diagram for a cross section of a positive electrode active material particle was obtained by using the method in step (3), where element $M^1$ was selected for testing; thickness values of a coating layer at 10 different locations on the cross section were obtained based on element distribution in the cross section, and an average value was calculated and recorded as a thickness T of the coating layer; and 10 diameter values of a positive electrode active material particle in different orientations in the cross section were obtained, and an average value was calculated and recorded as an average particle size $\overline{D}$ of the positive electrode active material.

(5) Determination of Average Valences α and β of Element $M^2$

At 25° C., 18 button batteries were respectively charged to an upper limit of a charge/discharge cut-off voltage at a constant current of 1C, then constant-voltage charged to a current less than or equal to 0.05 mA, then left for 2 minutes, and then discharged to a lower limit of the charge/discharge cut-off voltage at a constant current of 1C.

Then, the charged and then discharged 18 button batteries were respectively charged to 2.8V, 2.9V, 3.0V, 3.1V, 3.2V, 3.3V, . . . , 4.0V, 4.1V, 4.2V, 4.3V, 4.4V and 4.5 V (that is, the charging voltage step was 0.1 V) at a rate of 0.1C. Each charged button battery was taken to a drying room to take out a positive electrode plate as a sample. The sample was weighed to record mass of the sample, and then was put into a digestion tank, and 10 mL of aqua regia was slowly added as a digestion reagent. Then, the sample was put into a Mars5 microwave digestion instrument made by CEM in the United States, with digestion being carried out at a microwave emission frequency of 2450 Hz. The digested sample solution was transferred to a volumetric flask and shaken evenly, and a sample was taken and put into a sample feeding system of a 7000DV inductively coupled plasma optical emission spectrometer (ICP-OES) made by PerkinEhner (PE) in the United States, to test mass concentrations of Li, O, Ni, Co, Mn, and doping elements in the positive electrode active material with an argon pressure of 0.6 MPa and a reference frequency power of 1300 W. Based on the mass concentrations of these elements, chemical formulas at different voltages were obtained through conversion, and then delithiated states at each voltage were obtained. For example, the chemical formula of the positive electrode active material at a 2.8 V voltage obtained through conversion was $Li_{0.89}Ni_{0.8}Co_{0.1}Mn_{0.1}O_2$, and then a corresponding delithiated state is (1-0.89)×100%=11%. In other words, the 11% delithiated state corresponded to the battery voltage 2.8 V. Similarly, when the chemical formula of the positive electrode active material obtained through ICP-OES test and conversion was $Li_{0.22}Ni_{0.8}Co_{0.1}Mn_{0.1}O_2$, a corresponding voltage was a voltage corresponding to the 78% delithiated state.

After the voltages corresponding to the 11% delithiated state and the 78% delithiated state were obtained, an electrode plate containing the tested positive electrode active material was taken, and a button battery was prepared according to the above method. The button battery was respectively charged to the voltages corresponding to the 11% delithiated state and 78% delithiated state at a rate of 0.1C at 25° C., and then the following operations were performed:

(i) A button battery was cut open with a scissor in a drying room to take out an entire positive electrode plate; the positive electrode plate was put into a beaker, and an appropriate amount of highly pure anhydrous dimethyl carbonate (DMC) was added, and replaced every 8 hours; the positive electrode plate was cleaned for three consecutive times, put into a vacuum standing box in the drying room, and dried for 12 h in a vacuumed state of −0.096 MPa; and powder was scrapped from the dried positive electrode plate in the drying room with a blade for grinding, and about 50 mg of positive electrode active material powder was taken.

(ii) A surface of an aluminum foil of about 2 cm×2 cm was wiped clean with acetone, a double-sided tape of about 1 cm×1 cm was cut and stuck at the center of the aluminum foil, and a powder sample was spread uniformly on the double-sided tape with a clean stainless steel sampling spoon. Another aluminum foil wiped clean with acetone was taken to cover the sample. The entire aluminum foil was placed between two flat stainless steel plates, and then the stack was pressed by a tablet press at a pressure of about 10 MPa for 15 seconds.

(iii) The tableted sample was put into a sample cavity of an escalab 250Xi X-ray photoelectron spectrometer made by Thermo Fisher Scientific (Thermo) in the United States, with monochromatic Al Kα (hv=1486.6 eV) excitation source set, X-ray power set to 150 W, and focus spot set to 500 μm, so as to collect 2p or 3d spectrum of element $M^2$, and XPSpeak software was used for peak differentiating, to determine valence distribution of element $M^2$, and calculate an average valence of element $M^2$.

(6) Initial Gram Capacity Test for a Button Battery

At 25° C., a battery was charged to a charge cut-off voltage at a constant current of 0.1C, then constant-voltage charged to a current less than or equal to 0.05 mA, then left for 2 minutes, and then discharged to a discharge cut-off voltage at a constant current of 0.1C. A discharge capacity at this time was an initial gram capacity of the button battery.

(7) Initial Discharge Gram Capacity Test for a Full Battery

At 25° C., a battery was charged to a charge cut-off voltage at a constant current of ⅓C, then constant-voltage charged to a current less than or equal to 0.05 mA, then left for 5 minutes, and then discharged to a discharge cut-off voltage at a constant current of ⅓C. A discharge capacity at this time was an initial gram capacity of the full battery.

(8) High-Temperature Cycling Performance Test for a Full Battery

At 45° C., a battery was charged to a charge cut-off voltage at a constant current of 1C, then constant-voltage charged to a current less than or equal to 0.05 mA, then left for 5 minutes, and then discharged to a discharge cut-off voltage at a constant current of 1C. This was a charge and discharge cycle. A discharge capacity at this time was a specific discharge capacity $D_1$ in the first cycle. Totally 400 charge and discharge cycles were performed on the battery according to the foregoing method, and a specific discharge capacity in the $400^{th}$ cycle was recorded.

Capacity retention rate (%) of full battery at 1C/1C in $400^{th}$ cycle at 45° C.=$D_{400}D_1$×=100%

(9) High-Temperature Storage Performance (Low-Gas-Production Performance) Test for a Full Battery At 25° C., a battery was charged to a charge cut-off voltage at a constant current rate of 1C, and then constant-voltage charged to a current less than or equal to 0.05 mA. A volume of the battery was tested then and recorded as $V_0$. Then the battery was put into an 80° C. thermostat, and the volume of the battery after 10 days of storage was tested and recorded as $V_1$. In this test, the drainage method was used to test the volume of the battery.

Volume swelling rate ΔV (%) of full battery after 10 days of storage at 80° C.=$(V_1-V_0)/V_0$×100%

In tests (5) to (9), in Examples 1 to 31 and Comparative Examples 1 to 5, the charge/discharge cut-off voltage of the button battery was 2.8 V to 4.25 V, and the charge/discharge cut-off voltage of the full battery was 2.8 V to 4.2 V; and in Examples 32 to 35 and Comparative Examples 5 to 9, the charge/discharge cut-off voltage of the button battery was 2.8 V to 4.35 V, and the charge/discharge cut-off voltage of the full battery was 2.8 V to 4.3 V.

Table 2 shows test results of Examples 1 to 35 and Comparative Examples 1 to 9.

TABLE 1-1

| No. | Element $M^2$ | | | | Element $M^3$ | | Element $M^1$ | |
|---|---|---|---|---|---|---|---|---|
| | Type | Concentration (ppm) | σ (%) | α | β | Type | Concentration (ppm) | Type | Concentration (ppm) |
| Example 1 | Sb | 3014 | 8 | +5 | +3 | Al | 1027 | Al | 2034 |
| Example 2 | Ti | 2997 | 10 | +4 | +4 | Al | 998 | Al | 2147 |
| Example 3 | Nb | 3024 | 11 | +5 | +4 | Al | 1005 | Al | 2012 |
| Example 4 | Zr | 3054 | 8 | +4 | +4 | Al | 979 | Al | 2008 |
| Example 5 | Ru | 3016 | 9 | +8 | +4 | B | 968 | B | 2105 |
| Example 6 | Ge | 2968 | 12 | +4 | +4 | Zr | 1067 | Zr | 2017 |
| Example 7 | W | 3037 | 10 | +6 | +4 | Ti | 986 | Ti | 2034 |
| Example 8 | Sb + W | 3005 | 9 | +6 | +3 | Al | 1054 | Al | 2107 |
| Example 9 | Sb | 2997 | 8 | +5 | +3 | Al | 1013 | Al | 2084 |
| Example 10 | Ti | 3014 | 9 | +4 | +4 | Al | 994 | Al | 2041 |
| Example 11 | Nb | 100 | 10 | +5 | +4 | Al | 1008 | Al | 2107 |
| Example 12 | Nb | 1018 | 9 | +5 | +4 | Al | 996 | Al | 2011 |
| Example 13 | Nb | 5026 | 10 | +5 | +4 | Al | 967 | Al | 1990 |
| Example 14 | Nb | 6507 | 8 | +5 | +4 | Al | 984 | Al | 2046 |
| Example 15 | Sb | 3021 | 11 | +5 | +3 | Al | 100 | Al | 2004 |
| Example 16 | Sb | 2999 | 9 | +5 | +3 | Al | 2000 | Al | 1999 |
| Example 17 | Sb | 3052 | 10 | +5 | +3 | Al | 3000 | Al | 2014 |
| Example 18 | Sb | 3017 | 8 | +5 | +3 | Al | 974 | Al | 100 |
| Example 19 | Sb | 3008 | 9 | +5 | +3 | Al | 1007 | Al | 1500 |
| Example 20 | Sb | 2989 | 11 | +5 | +3 | Al | 998 | Al | 3000 |
| Example 21 | Sb | 3021 | 10 | +5 | +3 | Al | 400 | Al | 2000 |
| Example 22 | W | 3008 | 9 | +6 | +4 | Al | 1021 | Al | 2105 |

| No. | Element X | | Percentage | $\omega_1$ (%) | $\omega_2$ (%) | $D_v50$ (μm) | T (μm) | T/$\overline{D}$ |
|---|---|---|---|---|---|---|---|---|
| | Type | Concentration (ppm) | | | | | | |
| Example 1 | F | 2986 | 2.0 | 60 | 95 | 15 | 0.201 | 0.013 |
| Example 2 | F | 3028 | 2.2 | 62 | 94 | 13 | 0.249 | 0.019 |
| Example 3 | F | 3009 | 2.0 | 57 | 96 | 15 | 0.245 | 0.016 |
| Example 4 | F | 2974 | 2.1 | 60 | 93 | 13 | 0.212 | 0.016 |
| Example 5 | F | 3013 | 2.2 | 54 | 92 | 16 | 0.244 | 0.015 |
| Example 6 | F | 3029 | 1.9 | 59 | 95 | 14 | 0.229 | 0.016 |
| Example 7 | F | 2978 | 2.1 | 57 | 97 | 15 | 0.277 | 0.018 |
| Example 8 | F | 3006 | 2.0 | 60 | 95 | 14 | 0.255 | 0.018 |
| Example 9 | \ | \ | 2.1 | 58 | 94 | 16 | 0.249 | 0.016 |
| Example 10 | \ | \ | 2.1 | 60 | 93 | 15 | 0.251 | 0.017 |
| Example 11 | F | 2994 | 2.1 | 61 | 95 | 14 | 0.253 | 0.018 |
| Example 12 | F | 3028 | 2.0 | 59 | 94 | 15 | 0.249 | 0.017 |
| Example 13 | F | 2897 | 2.1 | 60 | 96 | 17 | 0.239 | 0.014 |
| Example 14 | F | 3018 | 2.1 | 57 | 93 | 16 | 0.261 | 0.016 |
| Example 15 | F | 2984 | 20 | 61 | 94 | 15 | 0.254 | 0.017 |
| Example 16 | F | 3026 | 1.0 | 59 | 96 | 14 | 0.253 | 0.018 |
| Example 17 | F | 3011 | 0.7 | 60 | 95 | 16 | 0.261 | 0.016 |
| Example 18 | F | 2997 | 0.1 | 58 | 94 | 15 | 0.232 | 0.015 |
| Example 19 | F | 3025 | 1.5 | 61 | 96 | 14 | 0.241 | 0.017 |
| Example 20 | F | 3101 | 3.0 | 62 | 93 | 16 | 0.253 | 0.016 |
| Example 21 | F | 3057 | 5.0 | 59 | 95 | 15 | 0.248 | 0.017 |
| Example 22 | F | 1000 | 2.1 | 60 | 94 | 14 | 0.251 | 0.018 |

TABLE 1-2

| No. | Element M² Type | Element M² Concentration (ppm) | σ (%) | α | β | Element M³ Type | Element M³ Concentration (ppm) | Element M¹ Type | Element M¹ Concentration (ppm) | Element X Type | Element X Concentration (ppm) | Percentage | $\omega_1$ (%) | $\omega_2$ (%) | $D_v50$ (μm) | T (μm) | T/$\overline{D}$ |
|---|---|---|---|---|---|---|---|---|---|---|---|---|---|---|---|---|---|
| Example 23 | W | 2889 | 10 | +6 | +4 | Al | 996 | Al | 1987 | \ | \ | 2.0 | 61 | 93 | 15 | 0.264 | 0.018 |
| Example 24 | W | 3121 | 9 | +6 | +4 | Al | 1057 | Al | 2002 | F | 5000 | 1.9 | 58 | 93 | 16 | 0.257 | 0.016 |
| Example 25 | Sb | 3052 | 20 | +5 | +3 | Al | 1014 | Al | 2013 | F | 3021 | 2.0 | 60 | 95 | 15 | 0.249 | 0.017 |
| Example 26 | Sb | 2996 | 8 | +5 | +3 | Al | 1102 | Al | 2026 | F | 3125 | 1.8 | 42 | 93 | 15 | 0.249 | 0.017 |
| Example 27 | Sb | 3005 | 9 | +5 | +3 | Al | 1117 | Al | 2031 | F | 3174 | 1.8 | 58 | 82 | 14 | 0.253 | 0.018 |
| Example 28 | Sb | 2999 | 10 | +5 | +3 | Al | 1008 | Al | 2007 | F | 3021 | 2.0 | 57 | 94 | 16 | 0.083 | 0.005 |
| Example 29 | Sb | 3084 | 11 | +5 | +3 | Al | 1021 | Al | 2011 | F | 3005 | 2.0 | 58 | 95 | 15 | 0.301 | 0.020 |
| Example 30 | Sb | 3047 | 9 | +5 | +3 | Al | 1004 | Al | 2024 | F | 3017 | 2.1 | 60 | 93 | 16 | 0.032 | 0.002 |
| Example 31 | Sb | 3018 | 10 | +5 | +3 | Al | 1034 | Al | 1998 | F | 3008 | 1.9 | 58 | 95 | 14 | 0.431 | 0.031 |
| Comparative Example 1 | \ | \ | \ | \ | \ | \ | \ | \ | \ | \ | \ | \ | \ | \ | 16 | \ | \ |
| Comparative Example 2 | \ | \ | \ | \ | \ | Al | 1020 | Al | 2003 | F | 2950 | 2.0 | 60 | 96 | 15 | 0.234 | 0.016 |
| Comparative Example 3 | Sb | 2998 | 8 | +5 | +3 | \ | \ | Al | 1987 | F | 3021 | \ | 59 | 94 | 14 | 0.227 | 0.016 |
| Comparative Example 4 | Sb | 3022 | 9 | +5 | +3 | Al | 1054 | \ | \ | F | 3074 | \ | 61 | 97 | 15 | \ | \ |
| Comparative Example 5 | Sb | 3064 | 35 | +5 | +3 | Al | 1028 | Al | 2027 | F | 3051 | 2.0 | 61 | 96 | 16 | 0.251 | 0.016 |
| Example 32 | Sb | 3008 | 8 | +5 | +3 | Al | 1007 | Al | 2014 | F | 2997 | 2.0 | 60 | 94 | 15 | 0.248 | 0.017 |
| Example 33 | Ti | 3014 | 9 | +4 | +4 | Al | 1010 | Al | 2009 | F | 3011 | 1.9 | 59 | 95 | 16 | 0.251 | 0.016 |
| Example 34 | Sb + W | 3025 | 10 | +6 | +3 | Al | 997 | Al | 2010 | F | 3009 | 2.0 | 58 | 93 | 14 | 0.264 | 0.019 |
| Example 35 | Sb | 3002 | 11 | +5 | +3 | Al | 1031 | Al | 2014 | \ | \ | 2.0 | 59 | 94 | 15 | 0.257 | 0.017 |
| Comparative Example 6 | \ | \ | \ | \ | \ | \ | \ | \ | \ | \ | \ | \ | \ | \ | 14 | \ | \ |
| Comparative Example 7 | \ | \ | \ | \ | \ | Al | 1008 | Al | 2014 | F | 3006 | 2.0 | 60 | 94 | 15 | 0.251 | 0.017 |
| Comparative Example 8 | Sb | 2974 | 10 | +5 | +3 | \ | \ | Al | 1998 | F | 2986 | \ | 59 | 95 | 16 | 0.249 | 0.016 |
| Example 9 | Sb | 3011 | 8 | +5 | +3 | Al | 1015 | \ | \ | F | 3012 | \ | 61 | 93 | 14 | \ | \ |

TABLE 2

| No. | Initial gram capacity of button battery (mAh/g) | Initial gram capacity of full battery (mAh/g) | Cycle capacity retention rate of full battery (%) | Volume swelling ratio of full battery (%) |
|---|---|---|---|---|
| Example 1 | 208.2 | 197.3 | 93.44 | 3.6 |
| Example 2 | 207.3 | 196.3 | 91.23 | 6.1 |
| Example 3 | 206.8 | 197.1 | 92.56 | 4.5 |
| Example 4 | 206.7 | 1974. | 91.43 | 8.3 |
| Example 5 | 207.4 | 196.3 | 93.21 | 7.4 |
| Example 6 | 205.9 | 194.7 | 92.81 | 6.1 |
| Example 7 | 206.8 | 196.5 | 91.43 | 5.7 |
| Example 8 | 207.1 | 195.9 | 92.07 | 6.4 |
| Example 9 | 206.3 | 196.4 | 90.03 | 11.2 |
| Example 10 | 205.6 | 196.1 | 90.04 | 13.7 |
| Example 11 | 200.4 | 191.8 | 86.31 | 28.9 |
| Example 12 | 204.7 | 194.8 | 91.26 | 9.1 |
| Example 13 | 201.8 | 190.3 | 89.41 | 14.2 |
| Example 14 | 197.3 | 187.6 | 85.17 | 23.4 |
| Example 15 | 206.6 | 196.8 | 90.32 | 8.3 |
| Example 16 | 207.1 | 196.5 | 93.17 | 4.1 |
| Example 17 | 206.8 | 196.7 | 90.41 | 7.9 |
| Example 18 | 207.2 | 197.4 | 89.12 | 26.7 |
| Example 19 | 207.4 | 196.8 | 92.34 | 12.3 |
| Example 20 | 202.1 | 191.8 | 86.73 | 9.1 |
| Example 21 | 205.3 | 194.6 | 86.81 | 13.2 |
| Example 22 | 206.8 | 196.7 | 91.35 | 6.1 |
| Example 23 | 205.9 | 196.5 | 90.11 | 12.8 |
| Example 24 | 204.3 | 194.8 | 87.24 | 16.3 |
| Example 25 | 206.8 | 195.1 | 88.15 | 17.2 |
| Example 26 | 205.7 | 196.3 | 88.35 | 18.3 |
| Example 27 | 206.1 | 196.5 | 87.29 | 17.5 |
| Example 28 | 207.9 | 197.2 | 89.15 | 12.8 |
| Example 29 | 203.8 | 193.4 | 90.75 | 8.6 |
| Example 30 | 208.2 | 197.5 | 86.47 | 24.3 |
| Example 31 | 201.5 | 190.8 | 85.33 | 6.4 |
| Comparative Example 1 | 198.3 | 187.2 | 81.54 | 62.3 |
| Comparative Example 2 | 196.1 | 186.4 | 85.37 | 24.8 |
| Comparative Example 3 | 705.7 | 195.1 | 90.14 | 16.1 |
| Comparative Example 4 | 206.4 | 196.7 | 88.79 | 77.4 |
| Comparative Example 5 | 202.1 | 191.4 | 84.37 | 25.9 |
| Example 32 | 178.6 | 174.8 | 95.41 | 4.2 |
| Example 33 | 177.9 | 174.3 | 94.36 | 4.6 |
| Example 34 | 178.1 | 173.9 | 95.04 | 3.8 |
| Example 35 | 176.7 | 172.3 | 93.02 | 5.1 |
| Comparative Example 6 | 171.1 | 168.7 | 83.35 | 38.9 |
| Comparative Example 7 | 170.6 | 167.9 | 86.21 | 18.2 |
| Comparative Example 8 | 169.3 | 165.8 | 85.34 | 19.1 |
| Comparative Example 9 | 173.4 | 168.2 | 87.35 | 70.5 |

It can be learned from comparison tests of Example 1 to 35 and Comparative Examples 1 to 9 that the matrix particle of the lithium nickel cobalt manganese oxide was uniformly doped with element M², the matrix particle was doped with element M³ that had a decreasing concentration in the direction from the exterior surface to the core of the matrix particle, the exterior surface of the matrix particle was also coated with the element M¹-containing oxide coating layer, and element M¹, element M², and element M³ were each selected from a specific type of element. This could ensure that the lithium-ion secondary battery had a high initial gram capacity; and good high-temperature cycling performance and high-temperature storage performance.

It can be learned from the results of Example 3, Example 25, and Comparative Example 5 that proper and uniform doping of element $M^2$ enabled the battery to have a high gram capacity and improve the high-temperature cycling performance, storage performance, and gas production performance of the battery.

It can be learned from the results of Examples 1, and 28 to 31 that the ratio of the thickness T of the coating layer to the average particle size $\overline{D}$ of the positive electrode active material falling within a proper range could more effectively improve the gram capacity, high-temperature cycling performance, and high-temperature storage performance of the battery.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A positive electrode active material, comprising a matrix particle and a coating layer covering an exterior surface of the matrix particle, wherein the matrix particle comprises a lithium nickel cobalt manganese oxide, and the coating layer has a thickness T ranging from 0.001 μm to 0.032 μm and comprises an oxide of element $M^1$;

the matrix particle is doped with element $M^2$ and element $M^3$, relative deviation of a local mass concentration of element $M^2$ in the matrix particle is 20% or below, and element $M^3$ in the matrix particle has a decreasing concentration from the exterior surface to a core of the matrix particle; and element $M^1$ is selected from the group consisting of Mg, Al, Ca, Ba, Ti, Zr, Zn, B, and any combinations thereof, element $M^2$ is selected from the group consisting of Si, Ge, Se, Ru, Rh, Pd, Sb, Te, Ta, W, Mo, Nb, and any combinations thereof, element $M^3$ is selected from the group consisting of Al, Ca, Ba, Zr, Zn, B, and any combinations thereof;

and wherein the lithium nickel cobalt manganese oxide is a compound represented by chemical formula 1:

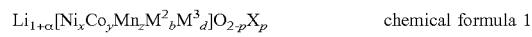   chemical formula 1 in chemical formula 1, X is selected from the group consisting of F, Cl, Br, S, and any combinations thereof, $0.7 \leq x < 0.9$, $0 < y < 0.3$, $0 < z < 0.3$, $-0.1 \leq \alpha \leq 0.2$, $0 < b \leq 0.1$, $0 < d \leq 0.1$, $0 \leq p \leq 0.1$, and $x+y+z+b+d=1$.

2. The positive electrode active material according to claim 1, wherein a concentration ratio of element $M^1$ to element $M^3$ is 0.1:1 to 20:1; and both a concentration of element $M^1$ and a concentration of element $M^3$ are concentrations in the positive electrode active material, measured in ppm, wherein the concentrations of element $M^1$ and element $M^3$ in the positive electrode active material are the mass ratios of the respective element in the positive electrode active material to the positive electrode active material in part per million and are measured as described in the description.

3. The positive electrode active material according to claim 1, wherein the matrix particle is doped with element X of 100 ppm to 5000 ppm, element X is selected from the group consisting of F, Cl, Br, S, and any combinations thereof, and a concentration of element X is a concentration in the positive electrode active material; and element X has a decreasing concentration in the direction from the exterior surface to the core of the matrix particle, wherein the concentration of element X in the positive electrode active material is the mass ratio of the respective element in the positive electrode active material to the positive electrode active material in part per million and is measured as described in the description.

4. The positive electrode active material according to claim 1, wherein element $M^1$ is the same as element $M^3$.

5. The positive electrode active material according to claim 1, wherein in the positive electrode active material, a concentration of element $M^1$ ranges from 100 ppm to 3000 ppm;

a concentration of element $M^2$ ranges from 100 ppm to 5000 ppm; and a concentration of element $M^3$ ranges from 100 ppm to 3000 ppm;

wherein the concentrations of element $M^1$, element $M^2$ and element $M^3$ in the positive electrode active material are the mass ratios of the respective element in the positive electrode active material to the positive electrode active material in part per million and are measured as described in the description.

6. The positive electrode active material according to claim 1, wherein a volume average particle size $D_v50$ of the positive electrode active material ranges from 8 μm to 20 μm.

7. The positive electrode active material according to claim 1, wherein the thickness T of the coating layer and an average particle size $\overline{D}$ of the positive electrode active material satisfy: $0.002 \leq T/\overline{D} \leq 0.031$.

8. A preparation method for a positive electrode active material, comprising:

(a) mixing a nickel-cobalt-manganese ternary material precursor, a lithium source, and an element $M^2$ precursor, and performing sintering treatment, to obtain a substrate particle uniformly doped with element $M^2$;

(b) mixing the substrate particle with a modifying-element precursor, and performing sintering treatment, to cause a modifying element to dope the substrate particle at a decreasing concentration from an exterior surface to a core of the substrate particle, to obtain a matrix particle, wherein the modifying element is element $M^3$ or a combination of element $M^3$ and element X; and (c) mixing the matrix particle with an element $M^1$ precursor, and performing sintering treatment, to form an element $M^1$-containing oxide coating layer having a thickness T ranging from 0.001 μm to 0.032 μm on an exterior surface of the matrix particle, so as to obtain a positive electrode active material, wherein relative deviation of a local mass concentration of element $M^2$ in the matrix particle is 20% or below, element $M^1$ is selected from the group consisting of Mg, Al, Ca, Ba, Ti, Zr, Zn, B, and any combinations thereof, element $M^2$ is selected from the group consisting of Si, Ge, Se, Ru, Rh, Pd, Sb, Te, Ta, W, Mo, Nb, and any combinations thereof, element $M^3$ is selected from the group consisting of Al, Ca, Ba, Zr, Zn, B, and any combinations thereof, and element X is selected from the group consisting of F, Cl, Br, S, and any combinations thereof; and wherein the matrix particle comprises a lithium nickel cobalt manganese oxide which is a compound represented by chemical formula 1:

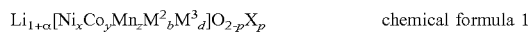  chemical formula 1 in chemical formula 1, X is selected from one or more of F, Cl, Br, and S, 0.7≤x<0.9, 0<y<0.3, 0<z<0.3, −0.1≤α≤0.2, 0<b≤0.1, 0<d≤0.1, 0≤p≤0.1, and x+y+z+b+d=1.

9. The preparation method according to claim 8, wherein the method further satisfies at least one of the following:
a temperature for the sintering treatment in step (a) is 600° C. to 1000° C.;
a temperature for the sintering treatment in step (b) is 600° C. to 950° C.; and
a temperature for the sintering treatment in step (C) is 150° C. to 500° C.

10. A positive electrode plate, comprising a positive electrode current collector and a positive electrode active substance layer disposed on the positive electrode current collector, wherein the positive electrode active substance layer comprises the positive electrode active material according to claim 1.

11. A lithium-ion secondary battery, comprising the positive electrode plate according to claim 10.

12. The positive electrode active material according to claim 4, wherein element $M^1$ and element $M^3$ are selected from the group consisting of Ti, B, Zr, and a combination thereof.

13. The positive electrode active material according to claim 1, wherein when the positive electrode active material is in a 78% delithiated state, an average valence of element $M^2$ is α; when the positive electrode active material is in an 11% delithiated state, an average valence of element $M^2$ is β; and α and β satisfy: α>β>+3.

14. The positive electrode active material according to claim 1, wherein $\omega_1$ is a percentage of a sum of mass of elements $M^1$, $M^3$, and X within a thickness range of ⅕ of a particle size of the matrix particle of the positive electrode active material in a direction from an exterior surface of the matrix particle to a core of the matrix particle, relative to a total mass of the elements $M^1$, $M^3$, and X in the matrix particle, and $\omega_1$ is from 40% to 62%.

15. The positive electrode active material according to claim 14, wherein $\omega_1$ is from 50% to 62%.

16. The positive electrode active material according to claim 1, wherein $\omega_2$ is a percentage of a sum of mass of elements $M^1$, $M^3$, and X within a thickness range of ⅔ of a particle size of the matrix particle of the positive electrode active material in a direction from an exterior surface of the matrix particle to a core of the matrix particle, relative to a total mass of the elements $M^1$, $M^3$, and X in the matrix particle, and $\omega_2$ is from 80% to 97%.

17. The positive electrode active material according to claim 16, wherein $\omega_2$ is from 90% to 97%.

18. The preparation method according to claim 8, wherein element $M^1$ is the same as element $M^3$, and element $M^1$ and element $M^3$ are selected from the group consisting of Ti, B, Zr, and a combination thereof.

* * * * *